United States Patent
Vichare et al.

(10) Patent No.: US 11,029,972 B2
(45) Date of Patent: Jun. 8, 2021

(54) METHOD AND SYSTEM FOR PROFILE LEARNING WINDOW OPTIMIZATION

(71) Applicant: Dell Products, LP, Round Rock, TX (US)

(72) Inventors: Nikhil M. Vichare, Austin, TX (US); Farzad Khosrowpour, Pflugerville, TX (US)

(73) Assignee: Dell Products, LP, Round Rock, TX (US)

(*) Notice: Subject to any disclaimer, the term of this patent is extended or adjusted under 35 U.S.C. 154(b) by 260 days.

(21) Appl. No.: 16/265,464

(22) Filed: Feb. 1, 2019

(65) Prior Publication Data

US 2020/0249962 A1 Aug. 6, 2020

(51) Int. Cl.

| | |
|---|---|
| *G06F 9/44* | (2018.01) |
| *G06F 9/445* | (2018.01) |
| *G06N 20/00* | (2019.01) |
| *G06F 11/30* | (2006.01) |
| *G06F 11/34* | (2006.01) |
| *G06F 9/50* | (2006.01) |

(52) U.S. Cl.
CPC ........ *G06F 9/44505* (2013.01); *G06F 9/5083* (2013.01); *G06F 11/3024* (2013.01); *G06F 11/3409* (2013.01); *G06N 20/00* (2019.01)

(58) Field of Classification Search
CPC .... G06F 11/3452; G06F 9/505; G06F 11/301; G06F 11/3051; G06F 11/3433; G06F 11/3409; G06F 1/3203; G06F 11/3447; G06F 11/3495; G06F 2209/508; A06F 2209/505

See application file for complete search history.

(56) References Cited

U.S. PATENT DOCUMENTS

| | | | |
|---|---|---|---|
| 10,108,522 B1* | 10/2018 | Jain | G06F 11/3409 |
| 2004/0068199 A1* | 4/2004 | Echauz | G06K 9/6262 600/544 |
| 2012/0310618 A1* | 12/2012 | B'Far | G06F 11/302 703/13 |
| 2013/0167131 A1* | 6/2013 | Carson | G06Q 10/06375 717/168 |
| 2018/0025276 A1* | 1/2018 | Hill | G06Q 10/00 706/11 |

(Continued)

*Primary Examiner* — Zahid Choudhury
(74) *Attorney, Agent, or Firm* — Prol Intellectual Property Law, PLLC; H. Kenneth Prol

(57) ABSTRACT

An information handling system operating a performance optimization system may comprise a processor executing computer program code instructions that interact with a plurality of computer operations and that is configured for iteratively sampling field performance data of the information handling system during learning windows having a preset duration and occurring at a preset frequency according to optimal learning window parameters, and adjusting the performance of the information handling system via adjustment of optimized system configurations based on application of a predetermined statistical model to the iteratively sampled field performance data. The optimal learning window parameters may be determined based on accuracy of previous application of the predetermined statistical model to test performance data of the information handling system.

20 Claims, 9 Drawing Sheets

(56) References Cited

U.S. PATENT DOCUMENTS

| | | | |
|---|---|---|---|
| 2018/0314617 A1* | 11/2018 | Khosrowpour | G06F 9/505 |
| 2018/0314774 A1* | 11/2018 | Khosrowpour | G06F 11/3414 |
| 2019/0102204 A1* | 4/2019 | Khosrowpour | G06F 11/302 |
| 2020/0184278 A1* | 6/2020 | Zadeh | G06F 16/953 |

* cited by examiner

METHOD AND SYSTEM FOR PROFILE LEARNING WINDOW OPTIMIZATION

FIELD OF THE DISCLOSURE

The present disclosure generally relates to adaptive adjustment of information handling system performance characteristics. The present disclosure more specifically relates to a method for optimizing frequency and duration of learning windows of a performance optimization system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a plurality of sensor devices for measuring functionality, security, location, and/or resource handling of an information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
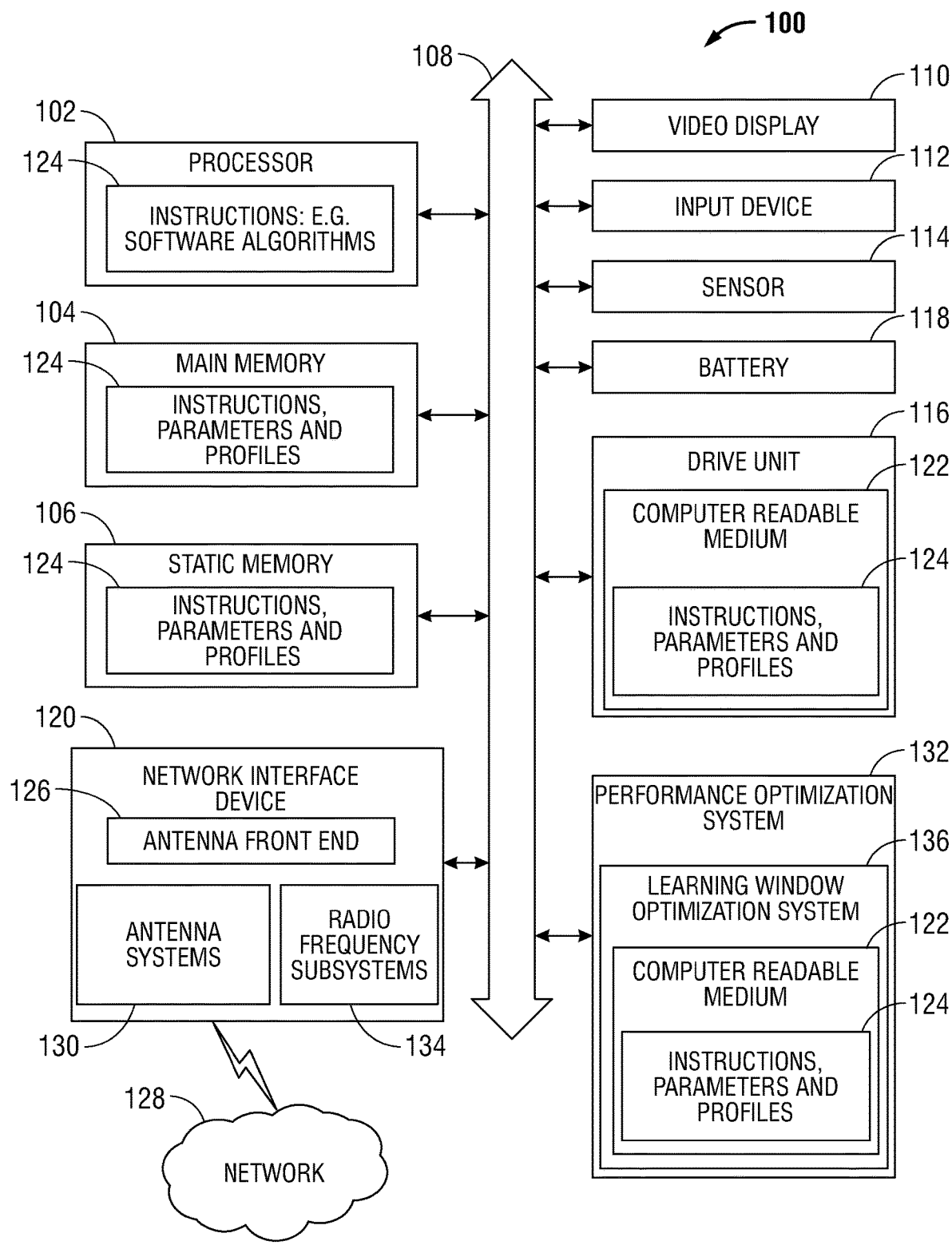
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems may vary regarding what information is handled, how the information is handled, how much information is processed, stored, or communicated, and how quickly and efficiently the information may be processed, stored or communicated. The variations in information handling systems allow for information handling systems to be general or configured for a specific user or specific use such as financial transaction processing, airline reservations, enterprise data storage, graphic design, gaming, virtual reality applications, or global communications, for example. In addition, information handling systems may include a variety of hardware and software components that may be configured to process, store, and communicate information and may include one or more computer systems, data storage systems, and networking systems.

With certain information handling systems, different applications can leverage system resources including hardware resources differently. Some applications may be multi-threaded and some applications may be single threaded. Some applications can benefit from a faster CPU speed and others from faster IO performance (e.g., due to transactional access to storage). Some applications may benefit from vertical synchronization (Vsync). Existing systems adjust system resources including hardware resources prior to providing a system to a customer for a particular application based upon static benchmark and workload analysis performed in a test environment, as well as providing a plurality of static profiles that may be used to adjust certain system resources in a predefined manner. There is a need for a method of optimizing performance of an information handling system dynamically that is based on workload analysis performed in the field during execution of applications by the user.

The performance optimization system in embodiments of the present disclosure addresses this issue by using a statistical model, such as a machine learning model, to analyze instrumentation measurement data describing utilization of various information handling system components. The performance optimization system may iteratively collect that instrumentation measurement data in the field during execution of a workload, and it may adjust the settings of the information handling system to optimize performance during such execution. Such a performance optimization operation takes into account complexities in dynamically adjusting system configurations for varying workload such as random stochastic variation in workload, abrupt user or operating system level discontinuities in the jobs, as well as instantaneous measurements and changes that otherwise might result in false triggers. The performance optimization operation leverages existing instrumentations used in a laboratory setting to build the statistical behavioral model via a machine learning approach. In certain embodiments, the performance optimization operation characterizes workloads in operation at runtime to analyze the performance of the system and to identify what parameters should be changed to obtain optimal performance and how.

In order for the performance optimization system to determine a system setting for the information handling system that will optimize its performance during execution of a given workload, the performance optimization system in such an embodiment may build a machine learning model that learns to identify workloads based on the instrumentation data recorded during execution of those workloads, then apply system settings that are already known to be optimal for those identified workloads. Because this is a learning process, the accuracy with which the machine learning model identifies the optimal system setting based on the instrumentation data increases as the volume of data the model uses to make that identification increases. In other words, as the model learns more (e.g., accesses a higher volume of data), the solutions it reaches (e.g., identifying optimal system settings) will become more accurate. As such, the accuracy of the statistical model will increase as the length of monitoring also increases.

However, dedication of computing resources to continuous monitoring necessary for such high volume data recording in the field may cause system lag or otherwise negatively impact execution of other tasks the user is attempting to simultaneously execute in the field. By decreasing the time spent during data collection to certain preset learning windows, the performance optimization system in an embodiment may decrease the computing resources dedicated to that process, thus improving overall user experience in executing other tasks. The learning window optimization system in an embodiment may set the configuration parameters of such a number and frequency of learning windows utilized and voting methods used to determine accuracy so as to minimize the computing resources used during data collection while simultaneously maintaining preset accuracy thresholds for the machine learning model. In order to do so, the learning window optimization system may test the accuracy of the machine learning model's ability to identify an optimal system setting based on instrumentation data gathered according to a plurality of learning window parameter configurations. The learning window parameter configuration that results in the most accurate estimation by the machine learning model of the optimal system setting for a known workload, which also may have known optimal system settings, may then be identified as the optimal learning window configuration for that workload. Thus, the learning window optimization system of embodiments of the present application may optimize the performance optimization system itself by balancing a need for accurate determination of optimal system settings and a need to limit the resources expended on such a determination.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the learning window optimization system 136, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input. The information handling system 100 can also include one or more sensors 114, a battery 118, and a disk drive unit 116. The sensor 114 in an embodiment may be any device capable of recording measurements of the environment immediately surrounding the information handling system 100, or any metrics describing the operational efficiency of the information handling system 100. Examples of sensors 114 in an embodiment may include may include a digital chronometer for providing hour/day measurements, a GPS sensor providing location measurements, an accelerometer within the GPS sensor providing measurements of the current configuration of the information handling system (e.g. clamshell mode, tablet mode, tent mode), and an antenna front end sensor providing communication link quality measurements. Sensors 114 may further include a metric recording system capable of monitoring various metrics of the information handling system operating system performance, including instrumentation measurement data of the processor 102 operation, instrumentation data of memory operation including memory 104, 106 and 116, instrumentation measurement data monitoring operation of one or more input devices 112, of the video display 110, of the battery 118 or other power management systems, wireless systems such as 120, and other systems of the information handling system.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, modem circuitry, one or more unified radio frequency front end circuits, one or more wireless controller circuits, amplifiers, antenna systems 130 and other radio frequency subsystem circuitry for wireless communications via multiple radio access technologies. Each radiofrequency subsystem 134 may communicate with one or more wireless technology protocols. The radiofrequency subsystem 134 may contain individual subscriber identity module (SIM) profiles for each technology service provider and their available protocols for subscriber based radio access technologies such as cellular LTE communications. The wireless adapter 120 may also include antenna systems 130 which may be tunable antenna systems for use with the system and methods disclosed herein.

The radio frequency subsystems 134 of the wireless adapters may also measure various metrics relating to wireless communication pursuant to operation of an antenna optimization system as in the present disclosure. For example, the wireless controller of a radio frequency subsystem 134 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 134.

The information handling system 100 can include a set of instructions 124 that can be executed to cause the computer system to perform any one or more of the methods or computer based functions disclosed herein. For example, instructions 124 may execute a learning window optimization system 136 and/or a performance optimization system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include WinAPIs (e.g. Win32, Win32s, Win64, and WinCE), Core Java API, or Android APIs.

The disk drive unit 116, the performance optimization system 132, and the learning window optimization system 136 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a machine learning model and a parameter grid. The disk drive unit 116 and static memory 106 also contain space for data storage. Further, the instructions 124 may embody one or more of the methods or logic as described herein. For example, instructions relating to the learning window optimization system 136 and performance optimization system 132 may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the learning window optimization system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The learning window optimization system 136, performance optimization system 132, and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a learning window optimization system 136 that may be operably connected to the bus 108. The learning window optimization system 136 computer readable medium 122 may also contain space for data storage. The learning window optimization system 136 may perform tasks related to determining optimal parameters for collection of instrumentation data used to optimize performance of the information handling system 100. In an embodiment, the learning window optimization system 136 may communicate with the main memory 104, the processor 102, the video display 110, the alpha-numeric input device 112, the sensors 114, the battery 118, and the network interface device 120 via bus 108, and several forms of communication may be used, including ACPI, SMBus, a 24 MHZ BFSK-coded transmission channel, or shared memory.

As will be appreciated, once the information handling system 100 is configured to perform the performance optimization operation, or the learning window optimization operation, the information handling system 100 becomes specifically configured to perform the performance optimization and/or learning window optimization processes as distinct from a general purpose computing device. Moreover, the implementation of the performance optimization operation and the learning window optimization process on the information handling system 100 improves the functionality of the information handling system and provides a useful and concrete result of improving the performance of the information handling system when the information handling system 100 when executing mixed workloads.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Further, in an exemplary, non-limited embodiment, implementations can include distributed processing, component/object distributed processing, and parallel processing. Alternatively, virtual computer system processing can be constructed to implement one or more of the methods or functionality as described herein. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
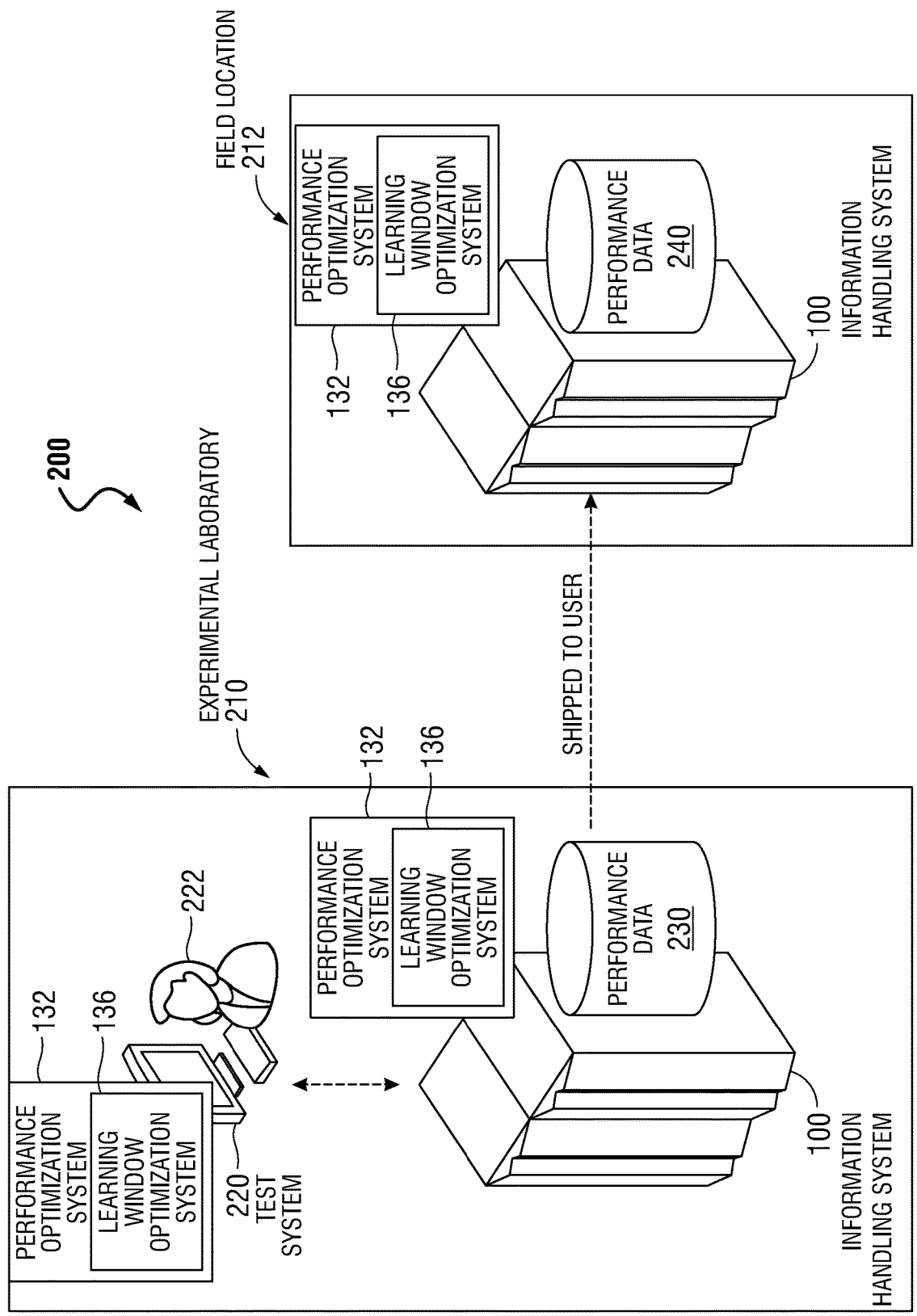
FIG. 2 is a block diagram illustrating a performance optimization environment according to an embodiment of the present disclosure.

FIG. 2 is a block diagram illustrating a performance optimization environment, including an experimental laboratory setting and a field location according to an embodiment of the present disclosure. In various embodiments, the performance optimization environment 200 includes one or more performance optimization systems 132, each of which may perform some or all of the functions of a performance optimization operation.

The performance optimization environment 200 in an embodiment may include an experimental laboratory 210 (which may also be a developer or manufacturer portion) and a field location 212 (which may also be a user portion). In various embodiments, the experimental laboratory 210 may include a test system 220 (which may also be an information handling system described with reference to FIG. 1) that interacts with the information handling system 100 for which the performance is being optimized. In various embodiments, the experimental laboratory 210 includes a repository of performance data 230. In certain embodiments, the information handling system for which the performance is being optimized may include application specific system configuration options.

Performance data 230 in an embodiment may include a machine learning model, instrument test data collected during execution of one or more known workloads (e.g., one or more applications) in the experimental laboratory 210, and system configuration options associated with those one or more workloads. That performance data 230 along with a selected machine learning model may be used to determine one or more optimal settings associated with those one or more workloads for various applications and operations on the information handling system. In addition, performance data 230 may also be sampled with an iterative sampling system that may include optimal learning window parameters associated with that workload in an embodiment. Once the machine learning model identifies optimal system settings/configurations and/or optimal learning window parameters for one or more workloads (or with the instrument data characterizing such workloads) in the experimental laboratory 210, the information handling system 100, including the performance optimization system 132, learning window optimization system 136, and performance data 230 may be delivered to an end user at the field location 212.

The field location 212 in an embodiment may include the information handling system 100 for which the optimal system settings/configurations and/or optimal learning window parameters were determined at the experimental laboratory 210. In other embodiments, the field location 212 may include an information handling system 100 that corresponds to some or all of the application specific system configuration options of the information handling system 100 from the experimental laboratory 210. In various embodiments, the field location 212 includes a repository of performance data 240. The repository of performance data 240 in an embodiment may include the system configuration options associated with one or more known workloads, and one or more known optimal settings associated with those known workloads, as determined in the experimental laboratory 210. In another embodiment, the repository of performance data 240 may also include instrument field data collected during execution of one or more known or unknown workloads in the field location 212 during usage by a user. The learning window optimization system 136 in an embodiment may direct an optimal collection of instrument field data on an unknown workload executed in the field location 212. The performance optimization system 132 in an embodiment may identify an optimal system setting/configuration for execution of that unknown workload based on the instrument field data collected, then apply that optimal system setting for optimized execution of that workload by the information handling system 100 in the field location 212.

Figure 3:
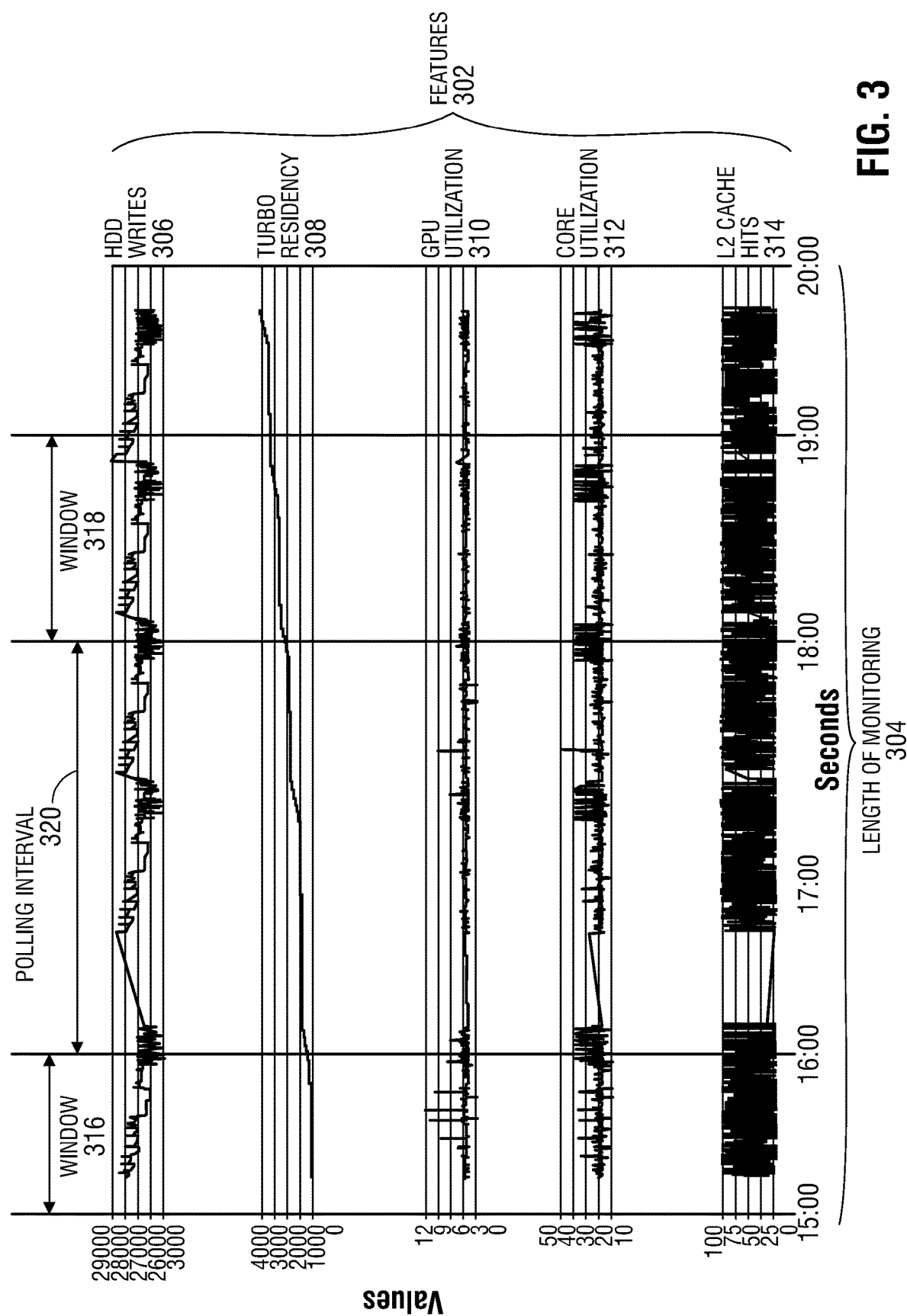
FIG. 3 is a graphical illustration of instrumentation data recorded during execution of a workload of interest according to an embodiment of the present disclosure.

FIG. 3 is a graphical illustration of instrumentation data recorded during execution of a workload of interest at an experimental laboratory or at a field location according to an embodiment of the present disclosure. Instrumentation data collected in an embodiment may reflect measurements of a plurality of features affecting performance of an information handling system. For example, such features 302 may include the number of Hard Disk Drive (HDD) writes, a turbo-residency, Graphics Processing Unit (GPU) utilization, core (CPU) utilization, and/or CPU Level 2 (L2) cache hits. These are only a handful of possible features 302 that may be measured as instrumentation data in an embodiment. Potentially hundreds of features may be measured in an embodiment, dependent upon the likelihood that such a feature may impact performance of a given workload in an embodiment.

In some embodiments, the instrumentation data may be gathered using a metric recording system capable of monitoring various metrics of the information handling system operating system performance, including performance of a CPU, a GPU, one or more memories, input devices, network interface adapters, buses, video displays, batteries, and communication with any operably connected peripheral devices. Operating system, BIOS, or other utilities may be utilized for detection of operating system performance metrics in coordination with various sensors or detection systems and interfacing with the various operational system of the information handling system. In other embodiments, the instrumentation data may be gathered via one or more sensors, which may be any device capable of recording measurements of the environment immediately surrounding the information handling system, including a digital chronometer for providing hour/day measurements, a GPS sensor providing location measurements, or an accelerometer within the GPS sensor providing measurements of the current configuration of the information handling system (e.g. clamshell mode, tablet mode, tent mode). Sensors in other embodiments may also include antenna front end sensors providing communication link quality measurements. Still other sensors capable of gauging performance of an information handling system are also contemplated, including smart devices and IoT devices.

Instrumentation data on features 302 may be measured and recorded over a preset monitoring length 304. For example, over the length of monitoring 304, or during portions of the length of monitoring 304, the performance optimization system in an embodiment may record or monitor HDD writes 306, turbo residency 308, GPU utilization 310, core utilization 312, and/or L2 cache hits 314 in one example embodiment. Other performance data measurements are contemplated in optional embodiments as well. As the length of monitoring increases, the data gathered over that period also increases. As described herein, the performance optimization system in an embodiment may determine a system setting for the information handling system that will optimize its performance during execution of a given workload. In order to do so, the performance optimization system in such an embodiment may build a machine learning model that learns to identify workloads based on the instrumentation data recorded during execution of those workloads, then apply system settings that are already known to be optimal for those identified workloads. For example, when a particular application such as a CAD drawing system is operating, particular system setting may be known to be optimal as compared to another application program or programs that may be operating in the information handling system. Because this is a learning process, the accuracy with which the machine learning model identifies the optimal system setting based on the instrumentation data increases as the volume of data the model uses to make that identification increases. In other words, as the model learns more (e.g., accesses a higher volume of data), the solutions it reaches (e.g., identifying optimal system settings) will become more accurate. As such, the accuracy of the model will increase as the length of monitoring 304 also increases.

However, dedication of computing resources to continuous monitoring necessary for such high volume data recording in the field may cause system lag or otherwise negatively impact execution of other tasks the user is attempting to simultaneously execute in the field. By decreasing the time spent during data collection (e.g., decreasing the length of monitoring 304) to certain preset learning windows, the performance optimization system in an embodiment may decrease the computing resources dedicated to that process, thus improving overall user experience in executing other tasks. The learning window optimization system in an embodiment may set the configuration parameters of such a learning window so as to minimize the computing resources used during data collection while simultaneously maintaining preset accuracy thresholds for the machine learning model. In order to do so, the learning window optimization system may test the accuracy of the machine learning model's ability to identify an optimal system setting based on instrumentation data gathered according to a plurality of learning window parameter configurations. The learning window parameter configuration that results in the most accurate estimation by the machine learning model of the optimal system setting for a known workload may then be identified as the optimal learning window configuration for that workload.

The learning window parameters in an embodiment that may impact accuracy of solutions determined by the machine learning model may include parameters controlling the length of frequency of monitoring or recordation of instrumentation data, as well as the voting method employed by the machine learning model to associate instrumentation data with optimal system settings. Parameters that may control the duration and frequency of monitoring in an embodiment may include a number of monitoring windows in which instrumentation data may be recorded. For example, a first subset of instrumentation data measuring HDD writes 306, turbo residency 308, GPU utilization 310, core utilization 312, and/or cache hits 314 may be recorded within a first window 316. As another example, a second subset of instrumentation data measuring the same features 302 may be recorded within a second window 318. In such an embodiment, the machine learning model may attempt to identify an optimal system setting using only the instrumentation data within these two windows 316 and 318. A plurality of such windows may occur during a learning session of either the performance optimization system or the learning window optimization system in an embodiment. The length of monitoring 304 may describe the duration of the full learning session, which may include a plurality of windows (e.g. 316 and 318).

One of the learning window parameters in each available configuration may dictate the number of windows that occur during a given length of monitoring. Examples of window number parameters available in an embodiment may include one window, three windows, five windows, and seven windows. Other window numbers determined to balance accuracy of the machine learning model and computing resources dedicated to collection of instrumentation data are also contemplated.

The duration of each window in an embodiment may be dictated by a length of monitoring parameter and a polling parameter. The length of monitoring parameter may set the duration of the full learning session that includes each of the set number of windows. For example, the monitoring length may be five seconds, as shown in FIG. 3. In other embodiments, the monitoring length may be any of a plurality of available candidate monitoring lengths, where the candidate monitoring lengths are predefined by the learning window optimization system. Other candidate monitoring lengths may include five, ten, fifteen, twenty, twenty-five, and thirty minutes.

The polling interval parameter may set the frequency at which each window occurs within the monitoring length. For example, the polling interval 320 may be set to two seconds, causing two seconds to elapse between the end of the first window 316 and the beginning of the second window 318. Other candidate polling intervals in an embodiment may include three seconds, and five seconds, for example. In various embodiments, other polling intervals determined to balance computing resources dedicated to collection of instrumentation data and accuracy of the machine learning model's determination of optimal system settings are also contemplated. The duration of each window (e.g., 316 and 318) in an embodiment may be determined based on the overall length of monitoring 304, number of windows, and polling interval 320 controlled by a given candidate learning window parameter configuration.

Figure 4:
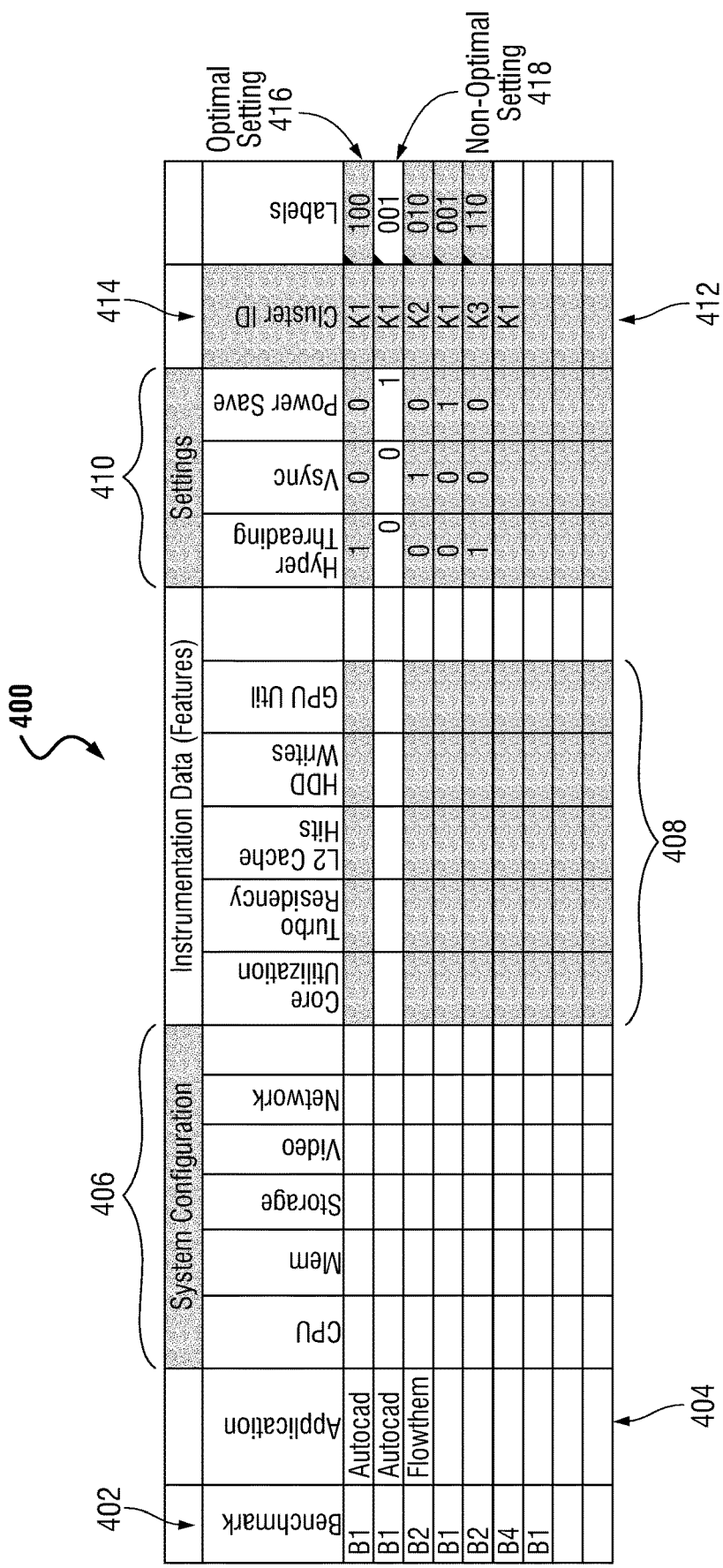
FIG. 4 is a table illustrating an example association of workloads with instrumentation data and optimal settings according to an embodiment of the present disclosure.

FIG. 4 is a table illustrating an example association of workloads with instrumentation data and optimal settings according to an embodiment of the present disclosure. Each row of table 400 may represent a different workload (e.g., application or combination of multiple applications). The table 400 in an embodiment may include a column 402 identifying multiple benchmarks associated with a given workload, a column 404 identifying a plurality of workloads, and a group of columns 406, each identifying a portion of a system configuration. A workload in an embodiment may be measured and characterized using instrumentation data on how the workload exercises various components of the information handling system, including the CPU, memory, storage, graphics, network sub-systems, and network interface device. Such instrumentation data may be stored in table 400 within the plurality of columns 408.

Through testing in a laboratory environment, or through multiple executions of the machine learning model in an embodiment, such instrumentation data 408 may be associated with system settings characterized by the columns 410. These system settings shown in columns 410 may be settings determined to be optimal for execution of the workload in an embodiment. For example, such optimal system settings 410 may indicate, for example, whether the given workload (identified in one row of column 404) is single-threaded or multi-threaded, whether it would benefit from vertical synchronization, or whether placing the information handling system in a power saving mode would negatively impact execution of the workload. In some embodiments, system settings within column 410 may also include system settings determined through testing to be non-optimal for execution of the workload.

Instrumentation data in column 408 and system settings in column 410 may be associated in table 400 with an identified centroid cluster in column 412 in some embodiments. Centroid clusters may be generated and identified by the machine learning model in some embodiments as part of the process used to associate unknown workloads with known optimal system settings, as described in greater detail with respect to FIG. 6.

Table 400 may also associate system settings in columns 410 with labels shown in column 414 indicating whether the system settings are optimal or non-optimal for execution of the given workload identified in column 404. For example, cell 416 in column 414 indicates the system settings in the first row of column 410 are optimal settings for execution of the workload identified in the first row of table 400. As another example, cell 418 in column 414 indicates the system settings in the second row of column 410 are non-optimal settings for execution of the workload identified in the second row of table 400. The identification of optimal and non-optimal settings in an embodiment may increase the accuracy of determinations made by the machine-learning model by providing both true positive and false positive reference points.

Figure 5A:
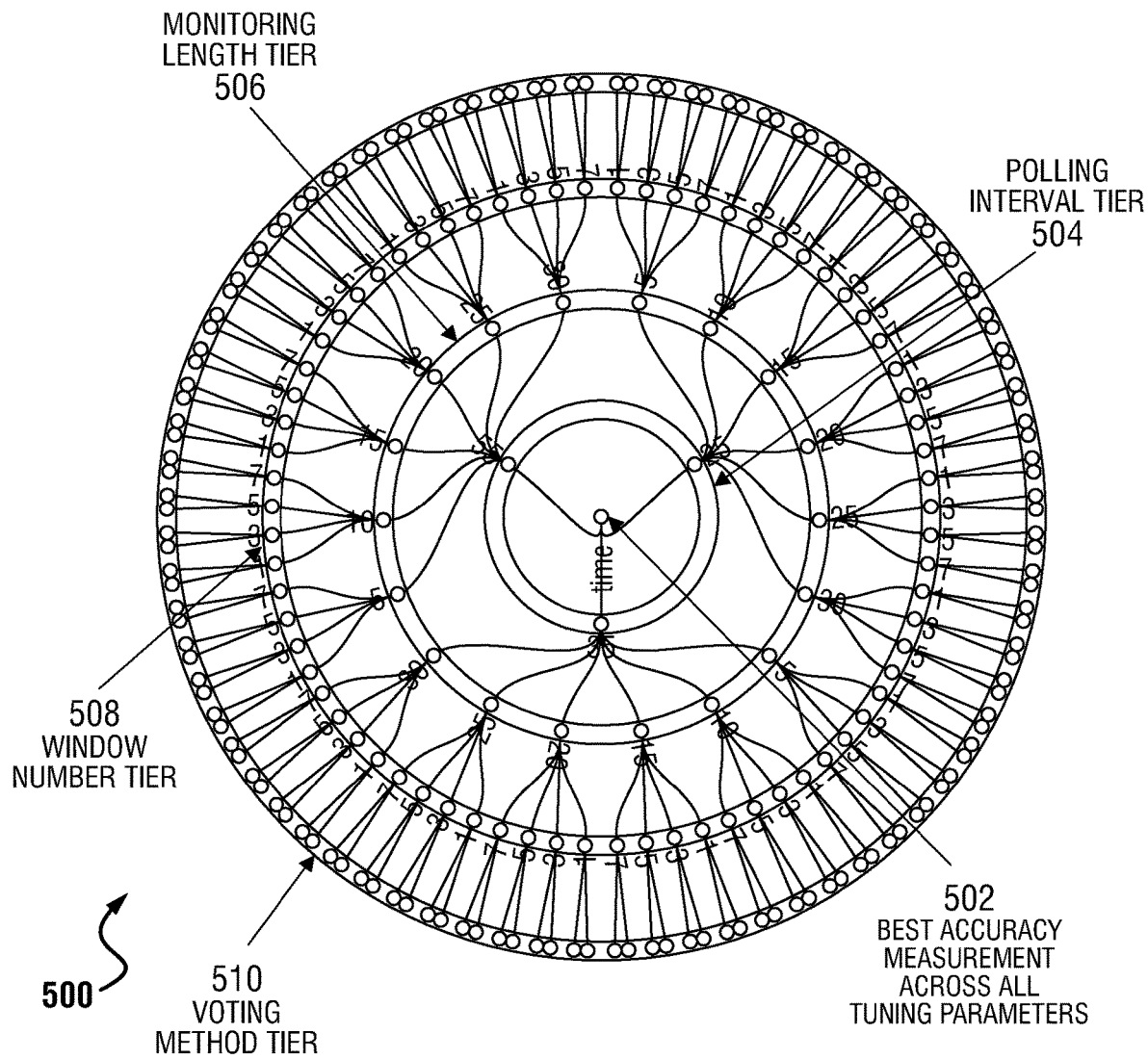
FIG. 5A is a graphical illustration of a learning window parameter grid according to an embodiment of the present disclosure.

FIG. 5A is a graphical illustration of a learning window parameter grid describing a plurality of candidate learning window parameter configurations according to an embodiment of the present disclosure. As described herein, the learning window optimization system in an embodiment may limit the time during which instrumentation data is collected to a plurality of learning windows having durations and frequencies set to minimize the computing resources used during data collection while simultaneously maintaining preset accuracy thresholds for the machine learning model. In order to identify a learning window duration and frequency most likely to achieve this goal, the learning window optimization system may test the accuracy of the machine learning model's ability to identify an optimal system setting based on instrumentation data gathered according to a plurality of learning window parameter configurations. The learning window parameter configuration that results in the most accurate estimation by the machine learning model of the optimal system setting for a known workload may then be identified as the optimal learning window configuration for that workload.

The parameter grid 500 illustrates each of the learning window parameter configurations the learning window optimization system may test for accuracy in an embodiment. Each node of the grid 500 in an embodiment may illustrate a measured value of the accuracy of an optimal system setting determination associated one of the available learning window parameter configurations. Each learning window parameter configuration in an embodiment may dictate one combination of a voting method, a learning window number, a length of monitoring, and a polling interval. Each of these parameters may have one of a plurality of candidate values. For example, a configuration may include one of two candidate voting methods, including a majority voting method, and a two-thirds majority voting method, which may control one or more aspects of a workload classification process employed by the machine-learning model. As another example, a configuration may include one of a plurality of candidate numbers of windows in which instrumentation data may be recorded in an embodiment, including one window, three windows, five windows, and seven windows. As yet another example, a configuration may include one of a plurality of candidate monitoring lengths and one of a plurality of candidate polling intervals, which may together dictate the duration and frequency of the learning windows. In an example embodiment, the candidate monitoring lengths may include five, ten, fifteen, twenty, twenty-five, and thirty minutes. In another aspect of an example embodiment, the candidate polling intervals may include two seconds, three seconds, and five seconds.

As described herein, each node or circle shown in the grid 500 may represent a measurement of the accuracy with which the machine-learning model may determine an optimal system setting based on the instrumentation data gathered in learning windows having a frequency and duration dictated by one of the available candidate learning window parameter configurations. For example, one node on the outside perimeter of the grid 500 may represent an accuracy of an optimal system setting determination made using a majority voting system based on instrumentation data gathered across seven windows, separated by two second polling intervals, over a five minute monitoring period. Accuracy measurements of similar determinations made using every possible combination of the candidate learning window parameters are represented by one of the remaining nodes located on the outer perimeter of the parameter grid 500.

The grid 500 includes a ring or tier for each of the learning window parameters. For example, the grid 500 includes an outer voting method tier 510, a window number tier 508, a monitoring length tier 506, and a polling interval tier 504. The grid 500 further includes a central node 502 constituting its own tier, representing the highest accuracy measurement for all possible combinations of learning window parameters. The location of a node in each tier 504-510 in an embodiment may identify one of the learning window parameters in a given configuration. For example, the polling interval tier 504 may include three nodes, one for a two second polling interval, one for a three second polling interval, and one for a five second polling interval. Each of the nodes in the polling interval tier 504 may be connected by a line to a plurality of nodes in the monitoring length tier 506, illustrating a combination of the polling interval illustrated by the placement of the node in the polling interval tier 504 and each of the possible monitoring lengths illustrated by the plurality of nodes in the monitoring length tier 506. For example, the node illustrating the two second polling interval in an embodiment may be connected to a plurality of nodes in the monitoring length tier 506, which may illustrate, respectively, the five, ten, fifteen, twenty, twenty-five, and thirty minute monitoring lengths.

Similarly, each of the nodes in the monitoring length tier 506 may be connected by a line to a plurality of nodes in the window number tier 508, illustrating a combination of the monitoring length illustrated by the placement of the node in the monitoring length tier 506 and each of the possible window numbers illustrated by the plurality of nodes in the window number tier 508. For example, the node in the monitoring length tier 506 illustrating the five minute monitoring length, and connected to the node in the polling interval tier 504 illustrating a two second polling interval in an embodiment may be connected to a plurality of nodes in the window number tier 508, which may illustrate, respectively, a single window, three windows, five windows, or seven windows.

In addition, each of the nodes in the window number tier 508 may be connected by a line to a plurality of nodes in the voting method tier 510, illustrating a combination of the window number illustrated by the placement of the node in the window number tier 508 and each of the possible voting methods illustrated by the plurality of nodes in the voting method tier 510. For example, the node in the window number tier 508 illustrating seven windows, and connected to the node in the monitoring length tier 506 illustrating the five minute monitoring length, and the node in the polling interval tier 504 illustrating a two second polling interval in an embodiment may be connected to a plurality of nodes in the voting method tier 510, which may illustrate, respectively, a majority voting method and a two-thirds voting majority method.

The outer perimeter of nodes falling within voting method tier 510 includes an accuracy measurement for determinations made using every possible combination of the candidate learning window parameters. The learning window parameter configuration that resulted in the accuracy measurements at each node in the voting method tier 510 in an embodiment may be identified by mapping the connections between the nodes of each tier 504-510 in an embodiment.

Figure 5B:
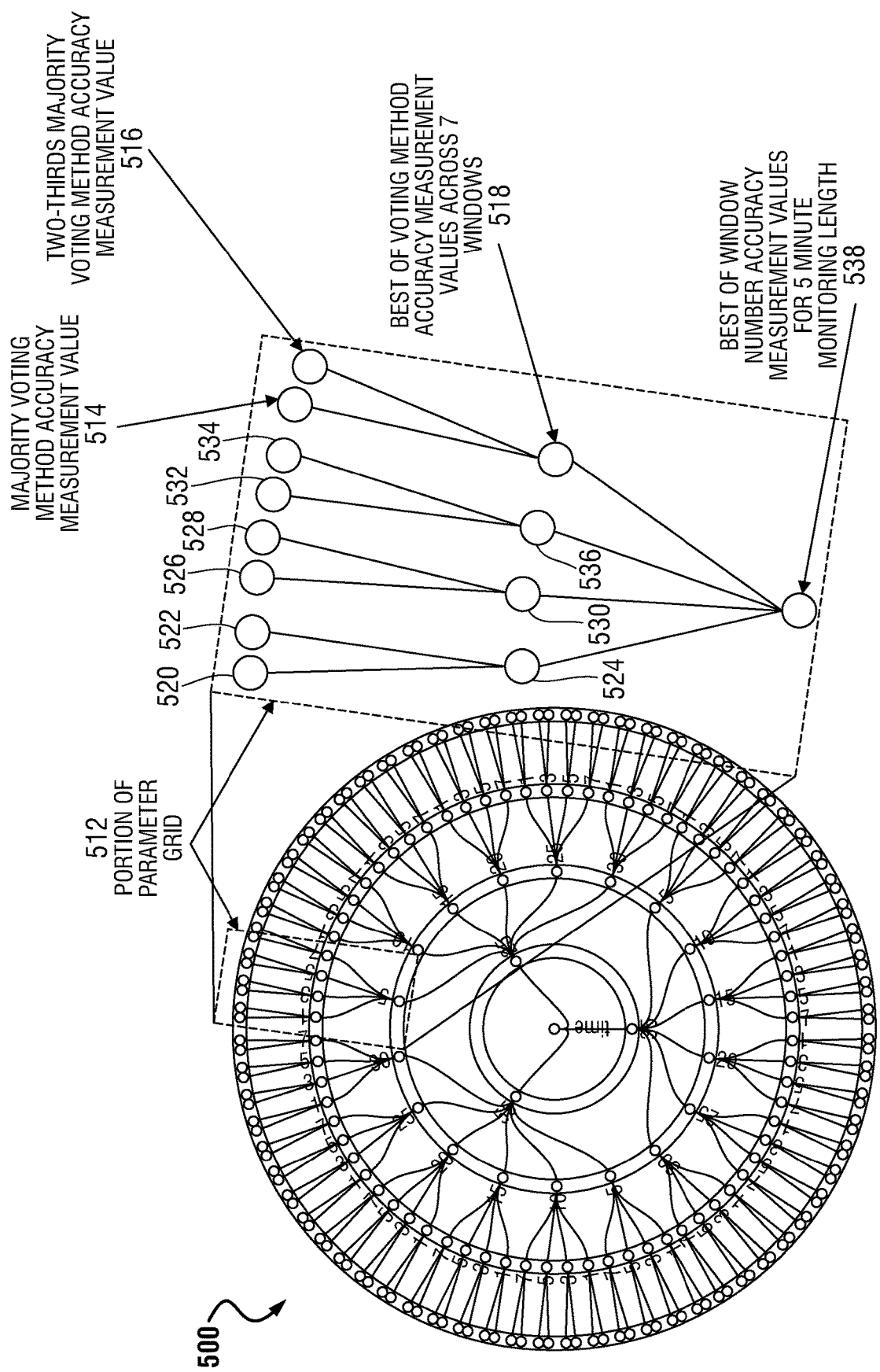
FIG. 5B is a graphical illustration of a portion of a learning window parameter grid according to an embodiment of the present disclosure.

FIG. 5B is a graphical illustration of a portion of a learning window parameter grid showing a plurality of candidate window numbers and candidate voting methods for a candidate monitoring length according to an embodiment of the present disclosure. The grid 500 may be used to determine a most accurate learning window parameter configuration in an embodiment by comparing accuracy measurements between nodes in each tier. Each of the nodes in voting method tier 510 may be grouped in an embodiment into a pair of nodes for comparison to one another based on their shared connection to a single node in the window number tier 508. For example, as shown in the enlarged illustration of the portion of the parameter grid 512, nodes 514 and 516, both of which are connected to node 518 may be compared against one another. Node 514 may illustrate accuracy of a determination of optimal system settings made in an embodiment using a majority voting method, based on instrumentation data gathered across seven windows, separated by two second polling intervals, over a five minute monitoring length. Node 516 in an embodiment may illustrate accuracy of a determination based on instrumentation data gathered using the same number of windows, monitoring length, and polling interval as node 514, but using a two-thirds majority voting method, rather than a majority voting method. Whichever of the accuracy measurements at nodes 514 and 516 is higher may then be illustrated at node 518. For example, if node 514 has an accuracy measurement (e.g., area under a receiver operating characteristic curve (ROC)) of 0.924 and node 516 has a ROC of 0.913, the value 0.924 may be associated with node 518. This may indicate the most accurate voting method for a determination made based on instrumentation data gathered across seven learning windows, separated by two second polling intervals, over a five minute learning period is 0.924, and it was achieved using a majority voting method.

Similar comparisons may be performed for each node-pair in the remainder of the voting method tier 510 in an embodiment. For example, the voting method tier nodes 520 and 522 may be compared, with their highest accuracy associated with node 524, nodes 526 and 528 may be compared, with their highest accuracy associated with node 530, nodes 532 and 534 may be compared, with their highest accuracy associated with node 536. Node 518 in such an embodiment may then be associated with the highest accuracy measurement for determinations made across seven learning windows, separated by two second polling intervals, over a five minute monitoring window, for all available voting methods. Node 536 in such an embodiment may be associated with the highest accuracy measurement for determination made across five learning windows, separated by two second polling intervals, over a five minute monitoring window, for all available voting methods. Node 530 in such an embodiment may be associated with the highest accuracy measurement for determination made across three learning windows, separated by two second polling intervals, over a five minute monitoring window, for all available voting methods. Similarly, node 526 in such an embodiment may be associated with the highest accuracy measurement for determination made across one learning window, separated by two second polling intervals, over a five minute monitoring window, for all available voting methods The values of each of these nodes may then be compared against one another to identify a highest accuracy measurement at node 538. By choosing the highest accuracy measurement among nodes 524, 530, 536, and 518 for association with node 538 in an embodiment, node 538 may represent the highest accuracy measurement for determination made for all available voting methods, across all available numbers of windows, separated by two second polling intervals, over a five minute monitoring length.

Figure 5C:
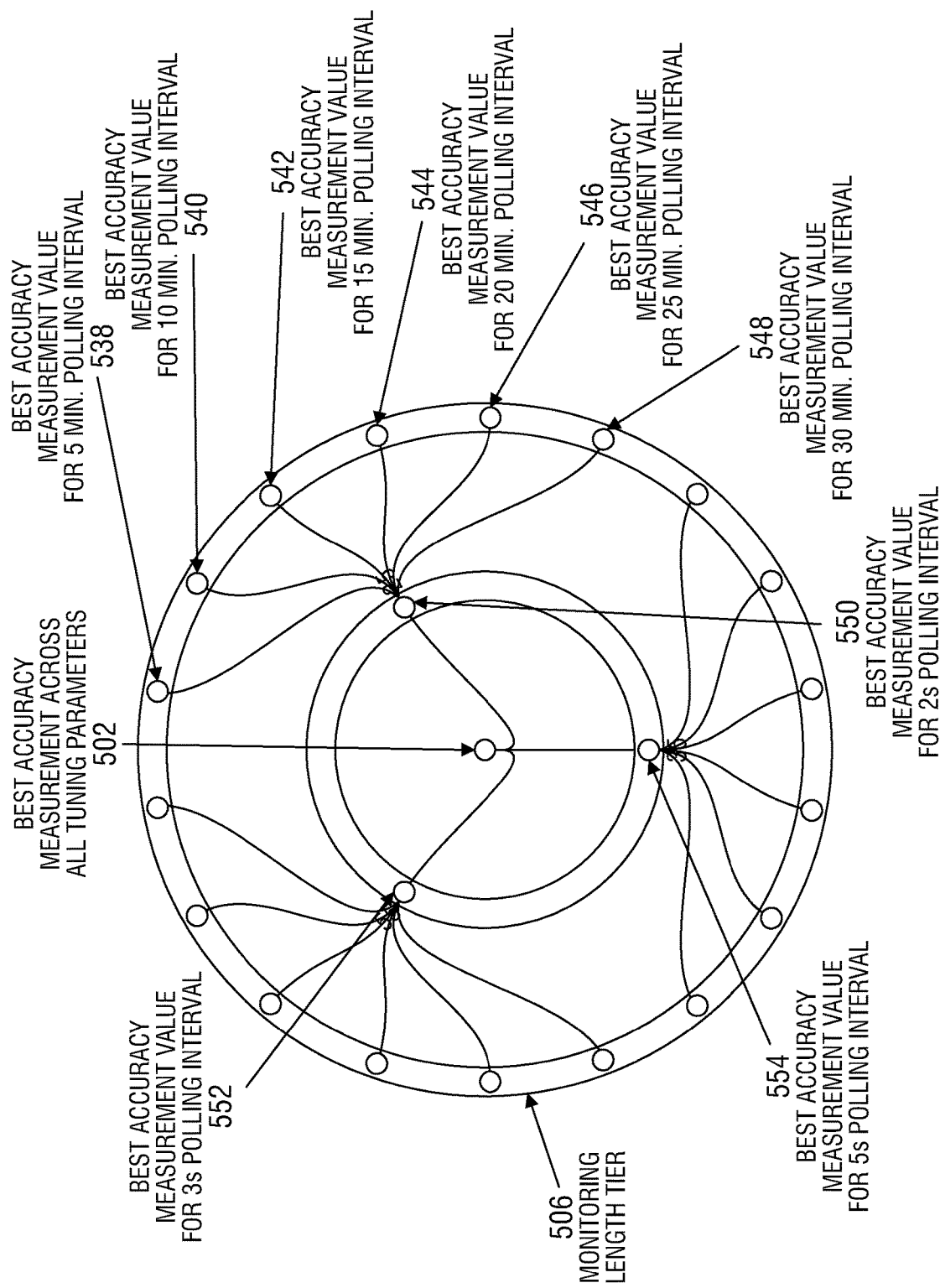
FIG. 5C is a graphical illustration of selection of an optimal learning window parameter configuration having a highest accuracy measurement according to an embodiment of the present disclosure.

FIG. 5C is a graphical illustration of selection of an optimal learning window parameter configuration having a highest accuracy measurement, chosen from a plurality of candidate learning window parameter configurations according to an embodiment of the present disclosure. By performing further comparisons between node values in an embodiment, a best accuracy measurement across all learning window parameters may be determined at node 502. As described with reference to FIG. 5B, comparison of nodes at each of the voting method tier 510, and the window number tier 508 may result in identification at node 538 of the highest accuracy measurement for determinations made for all available voting methods, across all available numbers of windows, separated by two second polling intervals, over a five minute monitoring window.

A similar comparison may also be made in an embodiment to associate node 540 with a highest accuracy measurement for determinations made for all available voting methods, across all available numbers of windows, separated by two second polling intervals, over a ten minute monitoring window. In the same way, node 542 may be associated with a highest accuracy measurement for determinations made for all available voting methods, across all available numbers of windows, separated by two second polling intervals, over a fifteen minute monitoring window. Similarly, node 544 may be associated with a highest accuracy measurement for determinations made for all available voting methods, across all available numbers of windows, separated by two second polling intervals, over a twenty minute monitoring window. Node 546 may be associated with a highest accuracy measurement for determinations made for all available voting methods, across all available numbers of windows, separated by two second polling intervals, over a twenty-five minute monitoring window in a similar fashion. In addition, node 548 may be associated with a highest accuracy measurement for determinations made for all available voting methods, across all available numbers of windows, separated by two second polling intervals, over a thirty minute monitoring window.

The values of each of these nodes 538-548 may then be compared against one another to identify a highest accuracy measurement at node 550 for determinations using a two second polling interval. By choosing the highest accuracy measurement among nodes 538-548 for association with node 550 in an embodiment, node 550 may represent the highest accuracy measurement for determination made for all available voting methods, across all available numbers of windows, over all available monitoring lengths, where the windows are separated by two second polling intervals. A similar comparison may be made among all nodes in the monitoring length tier 506 connected to node 552 to associate node 552 with the highest accuracy measurement for determination made for all available voting methods, across all available numbers of windows, over all available monitoring lengths, where the windows are separated by three second polling intervals. Yet another similar comparison may be made among all nodes in the monitoring length tier 506 connected to node 554 to associate node 554 with the highest accuracy measurement for determination made for all available voting methods, across all available numbers of windows, over all available monitoring lengths, where the windows are separated by five second polling intervals. The values of each of these nodes 550-554 may then be compared against one another to identify a highest overall accuracy measurement at node 502 for determinations made based on instrumentation data gathered according to all available learning window parameter configurations.

Figure 6:
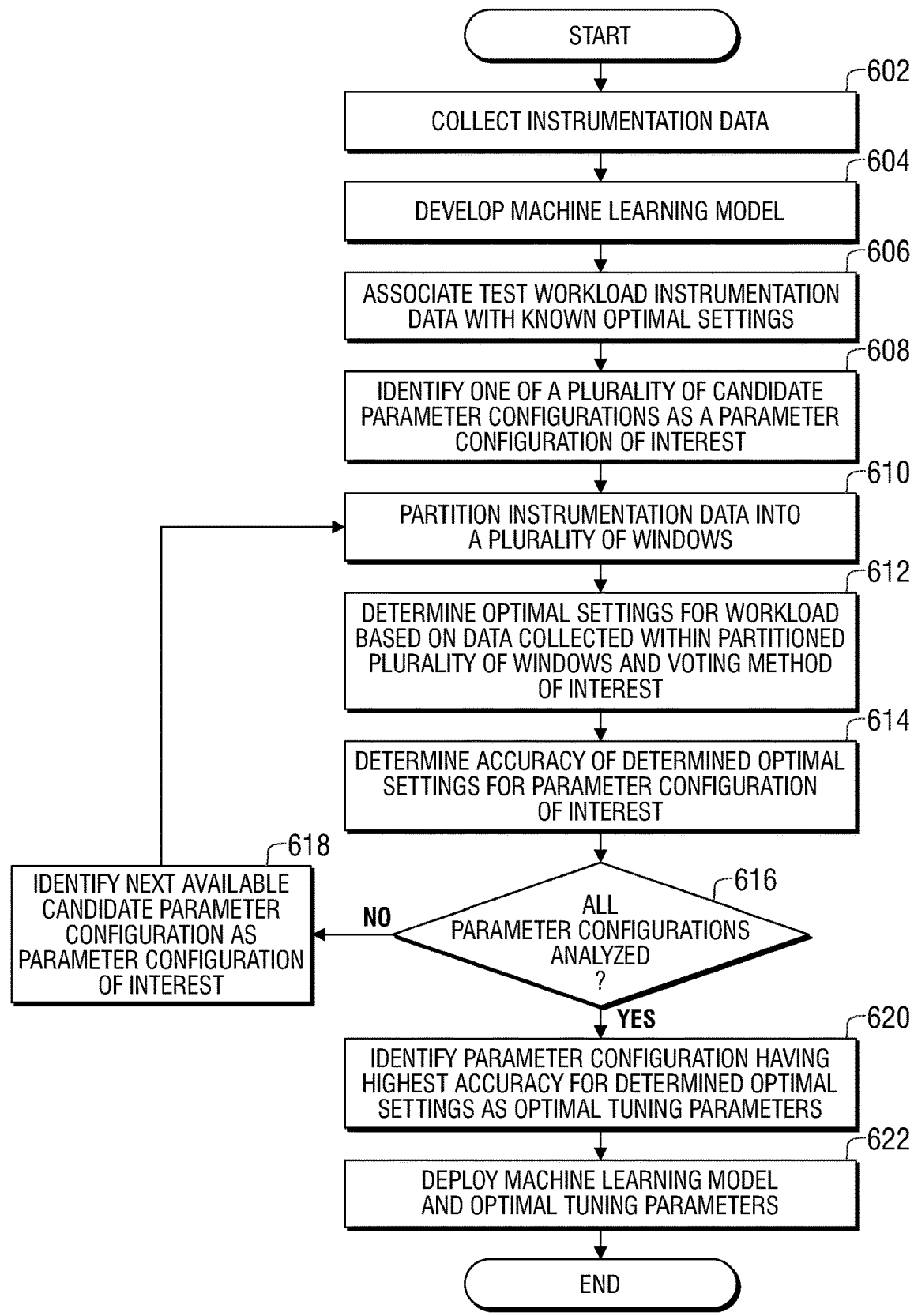
FIG. 6 is a flow diagram illustrating a method of identifying optimal learning window parameters for an application or workload according to an embodiment of the present disclosure.

FIG. 6 is a flow diagram illustrating a method of identifying optimal learning window parameters for an application or workload based on accuracy of optimal setting determinations made using each of a plurality of candidate learning window parameters according to an embodiment of the present disclosure. The method of identifying optimal learning window parameters in various embodiments may be performed at an experimental laboratory or at a field location.

At block 602, a test workload may be executed in an embodiment, and instrumentation data may be collected over the longest of a plurality of preset candidate monitoring lengths in one example embodiment. It is understood that any of the plurality of preset candidate monitoring lengths may be used in a first instance at 602, but for discussion purposes the longest monitoring length may be selected in an example embodiment. A performance optimization system of an information handling system in an embodiment may execute experiments on certain selected configurations and system settings. For example, in an embodiment described with reference to FIG. 2, a performance optimization system 132 of a test system 220 in an experimental laboratory 210 may execute experiments on certain selected configurations and system settings for the information handling system 110. By executing the experiments on known workloads in a laboratory setting, some or all of the configuration variables and system setting variables can be controlled by the tester. As another example, a performance optimization system 132 of the information handling system 100 operating at a field location 212 may execute those same experiments on certain configurations and system settings for the information handling system 110 while executing unknown workloads.

Such experiments may involve collection of instrumentation data characterizing the functionality of the information handling system over a preset period of time. As described herein, the length of time in which such data is recorded may be chosen from a plurality of preset candidate monitoring time period lengths. The longest of these preset candidate monitoring time period lengths may be identified at block 602 as the monitoring length of interest. For example, in an embodiment described with reference to FIG. 5C a plurality of preset candidate monitoring time period lengths may be available, including 5, 10, 15, 20, 25, and 30 minute periods. Returning to block 602 of FIG. 6, instrumentation data may be collected over a 30 minute time period in such an embodiment.

Instrumentation data collected in an embodiment may include measurements of a plurality of features affecting performance of an information handling system. For example, in an embodiment described with reference to FIG. 3, such features 302 may include the number of Hard Disk Drive (HDD) writes, a turbo-residency, Graphics Processing Unit (GPU) utilization, core (CPU) utilization, and/or CPU Level 2 (L2) cache hits. These are only a handful of possible features 302 that may be measured as instrumentation data in an embodiment. Potentially hundreds of features may be measured in an embodiment, dependent upon the likelihood that such a feature may impact performance of a given workload in an embodiment.

A machine learning model may be developed at block 604 in an embodiment. The performance optimization system in an embodiment may develop a machine learning model to classify workloads. A workload in an embodiment may be a combination of single or multiple applications that are executed on a user's system. A workload may be measured and characterized in an embodiment using instrumentation data on how the workload exercises various components of the information handling system (e.g., CPU, memory, GPU, or network interface device). The instrumentation data on each component may include hundreds of features in an embodiment. For example, for measurement of a processor, the performance optimization operation may analyze utilization, activity by core, processor queue length, turbo frequency, and/or C-state residence.

The machine learning model may be developed in a laboratory setting where the optimal system settings for a workload are known, but the instrumentation data for that workload is unknown. For example, in an embodiment described with reference to FIG. 4, it may be known upon execution of an AutoCAD® application constituting a workload that the Hyperthreading system setting is optimal. In such an embodiment, the values of core utilization, turbo residency, L2 cache hits, HDD writes, or GPU utilization measured during execution of the AutoCAD® application may not be known. Development of the machine-learning model may include associating these known optimal system settings (e.g., hyperthreading) with both the workload identification (e.g., AutoCAD®, or benchmark B1) and with the values of the core utilization, turbo residency, L2 cache hits, HDD writes, or GPU utilization measured during execution of the AutoCAD® application. In such an embodiment, similar instrumentation data measurements recorded in the future may then be identified as describing a known workload (e.g., AutoCAD®, or benchmark B1), and the optimal settings (e.g., hyperthreading) associated with that known workload may be applied to optimize performance of the information handling system during execution of that workload. The process of associating known optimal system settings with unknown instrumentation data measurements may be referred to herein as a workload classification process.

Workload classification in an embodiment may include classifying workloads into predefined performance clusters. Such a classification process may begin in a laboratory setting in an embodiment by associating instrumentation data collected during execution of a known workload by an information handling system set to known optimal settings for that known workload. It may further be known in some embodiments which of the instrumentation data collected is dependent upon or affected by changes in the settings of the information handling system (e.g., changing from the known optimal settings to some other setting).

The workload classification process in some embodiments may also include aggregating a variety of such known workloads into cluster centroids representing a number of distinct optimal settings. When performing the aggregation operation, a non-hierarchical clustering such as K-means is used to partition the dataset into K clusters, where K is equivalent to the number of distinct optimal settings. In some embodiments, the workloads are clustered by minimizing the sum of the squares to partition the workloads into K disjoint subsets. In certain embodiments, the distance metric is calculated using Euclidean, Mahanalobis or other distance metrics. In some embodiments, such clustering may be performed using a majority voting method, or a two-thirds majority voting method.

Classification of new and/or unknown workloads by the workload classification process in some embodiments may include identification of the proximity of the new unknown workload to a known cluster. By analyzing instrumentation data collected during execution of the unknown workload, the workload classification process may determine a nearest cluster to the unknown workload using a distance or similarity (e.g. Cosine similarity) measure. A candidate optimal system setting for the unknown workload may then be determined by identifying the system setting associated with a workload in the nearest cluster.

In other embodiments, the classification of the unknown workload may include a K-Nearest Neighbor (KNN) operation. The KNN operation in such an embodiment may provide an unsupervised machine learning operation that allows classification of datasets in a cluster. Other unsupervised machine learning operations that allow clustering of datasets are also contemplated. In these embodiments, the new workload data is compared for similarity with N nearest datasets to provide the candidate optimal setting for the unknown workload.

In some embodiments, the workload classification process may further include measuring the instrumentation data during execution of the same workload while the system is set to known non-optimal settings. In such a way, the machine-learning model may also develop an association between the known workload, known non-optimal system settings, and the instrumentation data that characterizes execution of such a known workload using the known non-optimal system settings. Such associations may assist in determining the accuracy of later associations made by the model between unknown workloads and known optimal system settings by identifying when the model has incorrectly determined a candidate optimal system setting. Such an incorrect determination may be referred to as a false positive. In contrast, associations made by the model between unknown workloads and known optimal system settings may be referred to as true positives.

The accuracy of the classification process used may be tested in some embodiments by using the classification process to determine candidate optimal setting for a known workload with a known optimal setting. The candidate optimal setting may then be compared against the known optimal setting. By performing such a test for multiple executions of the same workload, or for a single execution of multiple known workloads, a plurality of comparisons may be generated for gauging accuracy of the classification process. Such a plurality of comparisons may include a plurality of true positives, in which the candidate optimal setting for a given execution of the process matched the known optimal setting, as well as a plurality of false positives, in which the candidate optimal setting did not match the known optimal setting. A receiver operating characteristic curve may then be generated by comparing the rate of true positives to the rate of false positives across a plurality of executions. One measure of the accuracy of the classification process in an embodiment may include determining the area under the receiver operating characteristic curve, or area under the curve (AUC).

In other embodiments, a confusion matrix may be used to determine accuracy of the classification process. A confusion matrix may store the number of true positive associations and false positive associations made using the model across a plurality of workloads. For example, in an embodiment described with respect to FIG. 4, column 414 may represent a confusion matrix, where the value at cell 416 represents a true positive, and the value at cell 418 represents a false positive. By comparing the number of false positive values to the number of true positive values in the table 400, a rate of false positives for all executions of the model may be obtained.

The machine learning model classification process may be ready for deployment and analysis of unknown workloads (either in the laboratory or in the field) if the accuracy of the model meets a preset accuracy threshold. For example, if the accuracy of the classification process is measured using AUC, the model may be ready for deployment if the AUC meets a minimum threshold value of 0.9. Other embodiments may use a preset AUC threshold value between 0.5 and 0.9, or a value representing three times the AUC for a random classification. As another classification, if the accuracy of the classification process is measured using a confusion matrix, the model may be ready for deployment if there are fewer than 20% false positives.

At block 606, the test workload instrumentation data gathered over the monitoring length of interest may be associated with known optimal settings in an embodiment. In an embodiment, the workload of interest may be associated with a performance benchmark that represents known optimal settings for execution of the workload of interest. In certain embodiments, the known optimal settings for the workload of interest may be determined through one or more experiments performed in an experimental laboratory setting. In other embodiments, the known optimal settings may be determined through application of a machine learning model classification process known to meet preset accuracy thresholds to the instrumentation data collected at step 602. The performance optimization system in an embodiment may associate each of the potentially millions of values of the test workload instrumentation data gathered over the monitoring length of interest with the known optimal settings. Such an association may be referred to upon later executions of the same workload in order to determine if the workload is currently executing as efficiently as it could be in an information handling system setting optimized for execution of that workload.

One of a plurality of candidate parameter configurations may be identified as a parameter configuration of interest in an embodiment at block 608. The parameter configuration of interest in an embodiment may define one or more of a monitoring length of interest, a polling interval of interest, a window number of interest, and a voting method of interest. The accuracy of the classification process used to associate an unknown workload in the field with optimal system settings for that workload may vary in an embodiment based on which of these parameter configurations are used during the data collection stage employed in the field. For example, a classification process using continuous instrumentation data over an extended time period, resulting in a greater volume of information about the workload execution in an embodiment may result in a more accurate classification of that workload. In other words, the accuracy of a classification in an embodiment may increase as the volume of data recorded also increases. However, dedication of computing resources to continuous monitoring necessary for such high volume data recording in the field may cause system lag or otherwise negatively impact execution of other tasks the user is attempting to simultaneously execute in the field.

By decreasing the time spent during data collection to certain preset learning windows, the performance optimization system in an embodiment may decrease the computing resources dedicated to that process, thus improving overall user experience in executing other tasks. The learning window optimization system in an embodiment may set the configuration parameters of such a learning window so as to minimize the computing resources used during data collection while simultaneously maintaining preset accuracy thresholds for the classification process executed based on data gathered during such learning windows. In order to do so, the learning window optimization system may test the accuracy of application of the classification process to data gathered using every available combination of learning window configuration parameters. The learning window optimization system in an embodiment may select one of these available configuration parameters at block 608 for such an analysis of accuracy.

At block 610 in an embodiment, instrumentation data collected over the monitoring length of interest may be partitioned into a plurality of windows defined by the window number of interest and the polling interval of interest. Although the instrumentation data collected in the partitioned plurality of windows was collected during the same time period as the non-partitioned data, average values of many features may be altered upon partitioning. For example, 20% of the non-partitioned data in an example embodiment may indicate peak core utilization, but none of the time periods in which peak core utilization occurred may fall within the partitioned windows. In such an embodiment, the partitioned data may indicate no peak core utilization in comparison to the 20% peak core utilization indicated by the non-partitioned data. By partitioning the data already associated with a known optimal setting into a plurality of windows in such a way, then performing the classification process on the partitioned data to generate a candidate optimal setting, the learning window optimization system in an embodiment may gauge the impact the parameter configuration of interest has on accuracy of the classification process applied to data collected using such a configuration.

One or more candidate optimal settings for the workload may be determined at block 612 in an embodiment based on the voting method of interest and data collected within the partitioned plurality of windows. As described herein, the duration and frequency of the partitioned windows in an embodiment may depend upon the parameter configuration of interest, including the number of windows, length of monitoring, and polling intervals outlined by the parameter configuration of interest. For example, in an embodiment described with respect to FIG. 3, the values recorded throughout the entire length of monitoring 304 in an embodiment may represent the non-partitioned instrumentation data used to generate the known optimal settings. The configuration parameters of interest in an embodiment may dictate a length of monitoring 304 equivalent to the length of monitoring used to record the non-partitioned instrumentation data, a window number of two, and a polling interval of two seconds. The partitioned data in such an embodiment would include the instrumentation data recorded in learning window 316 over a duration of one second, and the instrumentation data recorded in learning window 318 over a duration of one second, where windows 316 and 318 are separated by the two second polling interval 320.

As described herein, the workload classification process in some embodiments may include aggregating the workload characterized by the partitioned data into cluster centroids representing a number of distinct candidate optimal settings. Such clustering in an embodiment may be performed using a majority voting method, or a two-thirds majority voting method, depending upon the voting method identified in the parameter configuration of interest. Application of the instrumentation data recorded in the partitioned learning windows (e.g., windows 316 and 318) may then be associated with a candidate optimal setting in an embodiment using a workload analysis operation. During such a workload analysis operation, the partitioned data (or cluster centroid that characterizes it) may be compared against other previously recorded instrumentation data the machine learning model has already associated with a known optimal system setting. The known instrumentation data that is most similar to the partitioned data, or the known instrumentation data centroid that is closest to the partitioned data centroid may then be identified. The optimal system setting associated in the machine learning model with the most similar known instrumentation data may then be identified as the candidate optimal system setting for the partitioned data.

In some embodiments, a candidate optimal system setting may be determined individually for each window partitioned according to one candidate learning window parameter configuration. For example, if the parameter configuration of interest identified at block 608 directs the partitioning of the collected data into seven separate windows at block 610, the learning window optimization system in such an embodiment may determine, at block 612, seven separate candidate optimal system settings. In such an embodiment, each of the seven separate candidate optimal system settings may be determined by applying the workload classification process to each of the seven windows of partitioned data separately. The learning window optimization system in such a scenario may associate a single parameter configuration of interest with multiple candidate optimal system settings. Some of these multiple candidate optimal system settings may constitute false positive results, and some may constitute true positive results, such that a single parameter configuration of interest may be associated with multiple true positives and multiple false positives.

At block 614, the accuracy of the optimal settings determined using the parameter configuration of interest may be gauged in an embodiment. The accuracy of the classification performed at block 612 may be gauged in an embodiment using the same or similar methods to those employed to test accuracy of the machine learning model at block 604. For example, the accuracy of the candidate optimal setting determination made for the workload described in the partitioned instrumentation data made at block 612 in an embodiment may be gauged by AUC (yielding a number between zero and one, with one being the most accurate value), or by a confusion matrix (yielding a percentage of false positives, with zero percent being the most accurate value). Other measurements capable of gauging accuracy of machine learning classification processes are also contemplated. The accuracy measurement for the candidate optimal setting determination made using the parameter configuration of interest in an embodiment may be stored in memory for later comparison to accuracy measurements for similar determinations made using other candidate parameter configurations. In some embodiments, only accuracy measurements reaching a preset accuracy threshold may be considered for comparison against other candidate parameter configurations. For example, in some embodiments, only AUC measurements meeting or exceeding 0.9, or confusion matrix measurements falling below 20% may be stored for later comparison.

In another embodiment, a supervised learning operation in an embodiment may include a validation process for determining accuracy of candidate optimal system settings. A candidate optimal setting for the partitioned instrumentation data may be determined through a supervised learning operation of the machine learning model based on the partitioned instrumentation data and upon either a majority voting method or a two-thirds majority method. In various embodiments, a supervised learning operation develops a relationship between unknown optimal settings for a given workload and instrumentation data collected when executing that workload. In other words, the supervised learning operation in an embodiment may use known or recorded instrumentation data values to identify an unknown candidate optimal setting.

The workload classification process described with reference to block 604 may constitute the training process in an embodiment. The determination of the candidate optimal setting described directly above may be performed on the partitioned data in all but one of the windows of the partitioned data as the test portion of the supervised learning process. The validation portion of the supervised learning process may involve performing the workload operation analysis described above on the final window of the partitioned data alone, and comparing the candidate optimal system setting associated with the final window alone to the candidate optimal system setting associated with the remainder of the partitioned data. If these two candidate optimal system settings are sufficiently similar, the candidate optimal system setting may be considered validated and stored to a memory, and the method may proceed to block 616.

It may be determined at block 616 in an embodiment whether optimal settings have been determined using each of the plurality of candidate parameter configurations in an embodiment. In order to minimize the computing resources used during data collection while simultaneously maintaining preset accuracy thresholds for the classification process executed based on data gathered during such learning windows, the learning window optimization system may test the accuracy of application of the classification process to data gathered using every available combination of learning window configuration parameters. For example, in an embodiment described with reference to FIG. 5A, the learning window optimization system may test the accuracy of candidate optimal settings determined based on instrumentation data gathered according to every available combination of candidate voting methods, window numbers, monitoring lengths, and polling intervals. Each circle in the parameter grid 500 in such an embodiment may represent a single stored accuracy measurement value associated with the parameter configuration defined by its position within the grid 500. At block 616, if a value has not been stored (or discarded for failure to meet accuracy thresholds) at each location within the voting method tier 510 in an embodiment, the learning window optimization system has not yet tested the accuracy of each of the available combinations of configuration parameters, and the method may proceed to block 618. If a value has been stored (or discarded) at each location within the voting method tier 510, the learning window optimization system in an embodiment may proceed to block 620.

At block 618, in an embodiment in which optimal settings have not been determined using each of the plurality of candidate parameter configurations, the next available candidate parameter configuration may be identified as the parameter configuration of interest. For example, in an embodiment described with reference to FIG. 5B, an accuracy measurement may have been stored for the parameter configuration symbolized by the node 522, using a two-thirds majority voting method, one window, a five-minute monitoring length, and a two second polling interval. In such an embodiment, if the learning window optimization system determines the candidate optimal settings have not been determined for all available combinations of parameter configurations, it may proceed to identify the configuration symbolized by the next available node 526 within the voting method tier 510 (moving in a clockwise direction) as the parameter configuration of interest. The method may then proceed back to block 610 for partitioning of the instrumentation data gathered at block 602 into three windows over a five-minute monitoring length, separated by two second polling intervals. The learning window optimization system in such an embodiment may then repeat the loop between blocks 610 and 616 until accuracy measurements for each of the available combinations of parameter configurations are either stored or discarded.

In an embodiment in which optimal settings have been determined using each of the plurality of candidate parameter configurations, the candidate parameter configuration resulting in the most accurate optimal settings may be identified as the optimal tuning configuration at block 620. A most accurate optimal setting in an embodiment may be determined by performing a comparison between stored accuracy measurements associated with each of the candidate optimal learning window parameters. For example, in an embodiment described with reference to FIG. 5A, once the accuracy measurements have been stored for each of the parameter configurations described by a node along the outer voting method ring 510 of the parameter grid 500, the values at each node may be compared.

With reference to FIG. 5B, in an example embodiment, the accuracy measurement value (e.g., AUC) of the candidate optimal system setting determined based on instrumentation data gathered according to the tune parameters represented by node 514 may be compared to the AUC of the candidate optimal system setting determined based on instrumentation data gathered according to the tune parameters represented by node 516. In such an embodiment, node 514 may represent learning window parameters including a two second polling interval, a five minute monitoring length, seven monitoring windows, and a majority voting method. Node 516 in an embodiment may represent learning window parameters including a two second polling interval, a five minute monitoring length, seven monitoring windows, and a two-thirds majority voting method. In other words, the parameters represented by nodes 514 and 516 differ only in the voting method applied. By identifying the higher accuracy measurement (e.g., AUC) between nodes 514 and 516, the highest possible accuracy measurement for all combinations of learning window parameters including a two second polling interval, a five minute monitoring length, and seven monitoring windows may be identified. In a similar fashion, the highest possible accuracy measurement for all combinations of learning window parameters including a two second polling interval, a five minute monitoring length, and one monitoring window may be represented at node 524 through comparison of the values at nodes 520 and 522. The highest possible accuracy measurement for all combinations of learning window parameters including a two second polling interval, a five minute monitoring length, and three monitoring windows may be represented at node 530 through comparison of the values at nodes 526 and 528. The highest possible accuracy measurement for all combinations of learning window parameters including a two second polling interval, a five minute monitoring length, and five monitoring windows may be represented at node 536 through comparison of the values at nodes 532 and 534. Once the values of nodes 524, 530, 536, and 518 are known, the highest possible accuracy measurement for all combinations of learning window parameters including a two second polling interval, and five minute monitoring length, may be represented at node 538 through comparison of the values at nodes 524, 530, 536, and 518.

In an embodiment described with reference to FIG. 5C, the node 538, representing the best accuracy measurement value for all combinations of learning window parameters including a two second polling interval, and five minute monitoring length may be located within the monitoring length tier 506. Similar best accuracy measurement values for all other combinations of learning window parameters including a two second polling interval and various other monitoring lengths may be represented by nodes 540-548. By comparing the values of nodes 538-548 to identify the highest accuracy value among them, the best accuracy measurement value for all combinations of learning window parameters may be identified at node 550. Similarly, best accuracy measurement values for all possible learning window parameter combinations using the three second polling interval may be identified at node 552, and using the five second polling interval at node 554. By comparing each of the values at nodes 550-554 in an embodiment, the best accuracy measurement across all learning window parameters may be identified at node 502. The path of the best accuracy measurement value at node 502 may be traced in an embodiment back through each of the tiers 504-510 to identify the combination of learning window parameters associated with the best accuracy measurement value represented at node 502, and that combination of learning window parameters may be identified as the optimal combination of learning window parameters at block 620.

At block 622, the machine learning model and optimal learning window parameters in an embodiment may be deployed. The machine learning model may include associations between known instrumentation data and known optimal settings, and/or known non-optimal settings. It may also include associations between known instrumentation data and the optimal learning window parameters identified at block 620. The process may then end.

The method of identifying optimal learning window parameters described by FIG. 6 may occur in an experimental test environment, and also in a field environment. In an embodiment in which the method occurs in the experimental test environment, the optimal learning window parameter configuration determined at block 620 may be stored as a default learning window parameter configuration for the workload instrumentation data gathered at block 606. In an embodiment in which the method occurs in the field environment, the machine learning model may have already been developed during the test environment, thus negating the need for the development of the machine learning model at block 604.

Further, workload instrumentation data collected in the field may have already been associated (during testing) with a default learning window parameter configuration determined in the testing to be optimal for that workload. However, variations in environment of the information handling system between the test environment and the field environment may cause this default configuration to diverge from a true optimal configuration. As such, the method of FIG. 6 may be repeated in order to develop a true optimal learning window parameter configuration for the field environment. In such an embodiment, the known optimal settings at block 606 may be the system settings associated with the default learning window parameter configuration.

During execution of the method of FIG. 6 in a field environment, workload instrumentation data may be gathered according to the default learning window parameter configuration, rather than in a single preset monitoring period as described with reference to block 602. In other words, instead of partitioned data collected over a preset monitoring period that could include several windows of varying durations and frequencies at block 610, the learning window optimization system operating in a field environment may collect instrumentation data at block 602 in a plurality of windows, each having a duration and frequency dictated by the length of monitoring, and polling interval of the default tuning configuration. The machine learning model may then perform the method described by blocks 608-622 to determine a true optimal learning window parameter configuration for use in the field environment in various embodiments.

Figure 7:
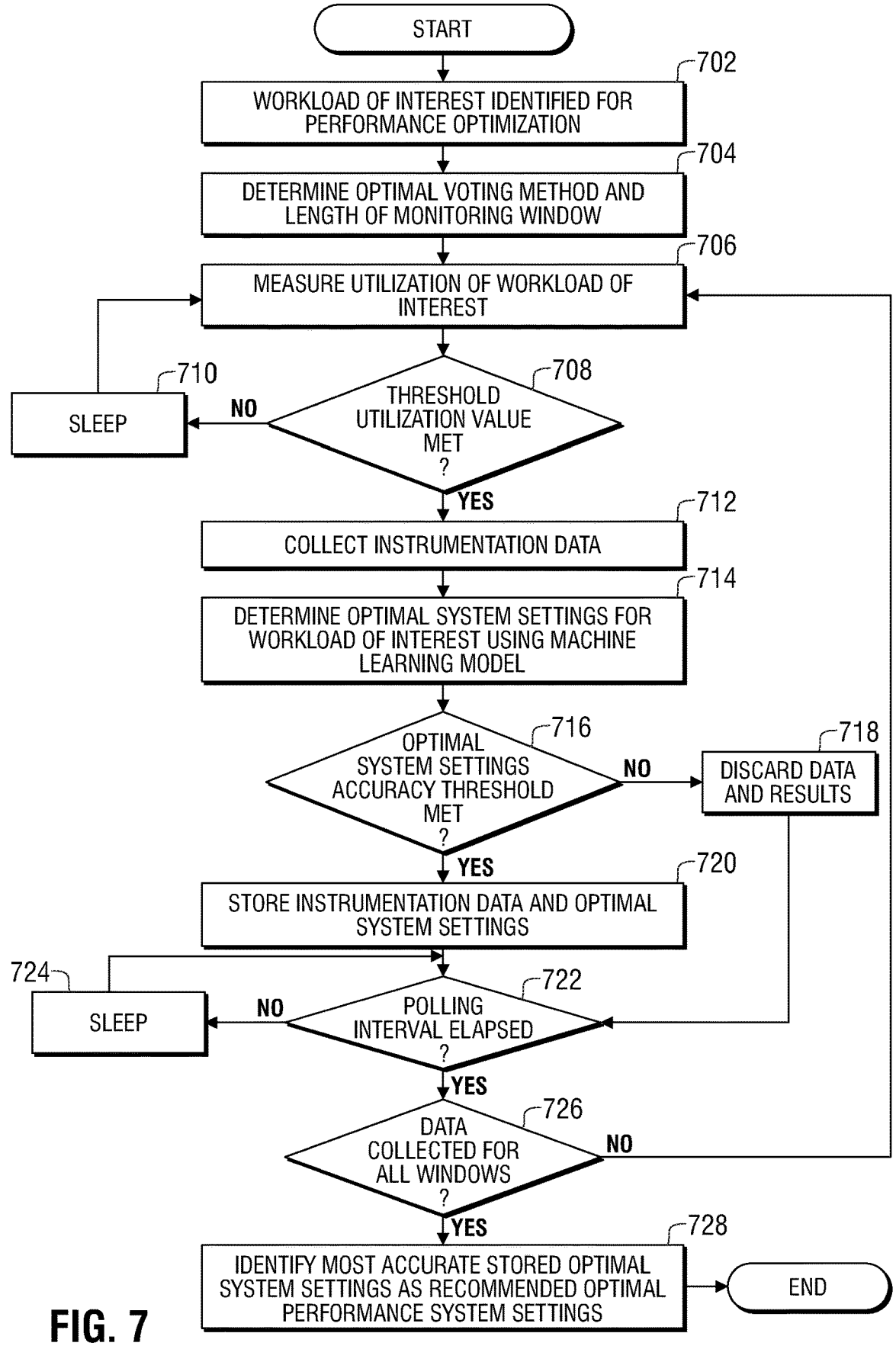
FIG. 7 is a flow diagram illustrating a method of identifying optimal system settings according to an embodiment of the present disclosure.

FIG. 7 is a flow diagram illustrating a method of identifying optimal system settings using a learning method executed in accordance with gathering data utilizing optimal learning window parameters according to an embodiment of the present disclosure. As described herein, a machine-learning model may learn a process for optimizing performance of a plurality of known workloads in a test or laboratory environment to develop a statistical model for that information handling system operation. Default or suggested learning window parameter configurations may also be determined for each of the known workloads in such a test setting in an embodiment. Following such a laboratory-based learning process, the machine-learning model and default learning window parameter configurations may be deployed to a field environment in which the machine learning model may further optimize performance in the field.

As also described herein, the process for determining optimal learning window parameter configurations may also be repeated in the field to generate field-optimized learning window parameter configurations for one or more workloads. Following such a field execution of the process for determining optimal learning window parameter configurations, the machine-learning model further optimize performance of the information handling system for execution of new and unknown workloads in the field, as illustrated by the flowchart of FIG. 7.

At block 702, the performance optimization system in an embodiment may identify a workload of interest currently being executed in the field for performance optimization. In some embodiments, the workload of interest may be identified by selection of that workload or application by the user via a graphical user interface. In other embodiments, identification of a workload of interest in an embodiment may be automatically executed upon detection of execution of one or more applications associated with known workloads in the machine learning model.

The learning window optimization system in an embodiment may identify the optimal voting method and length of monitoring window to employ in the performance optimization process for the workload of interest at block 704. As described herein, a default learning window parameter configuration for the workload of interest may be determined in a laboratory environment prior to execution of the performance optimization system in the field and prior to block 704. As also described herein, a field-optimized learning window parameter configuration for the workload of interest may have been previous determined in the field, prior to this iteration of the performance optimization process described with reference to FIG. 7. Both the default learning window parameter configuration identified in the former example and the field-optimized learning window parameter configuration identified in the latter example may define the optimal voting method and the length of monitoring window for collection of data in the current iteration of the performance optimization process.

At block 706 in an embodiment, the performance optimization system may measure utilization of the workload of interest. The most accurate estimations of optimal system settings given for a workload in an embodiment may be made based on analysis of instrumentation data collected when the information handling system is actively executing tasks relating to the workload of interest. Each of the workloads may be characterized by random stochastic variation in instrumentation data, or abrupt user or operating system level discontinuities in jobs. Optimal settings determined based on instrumentation data gathered when the application associated with the workload is idle, or when the user has stepped away for some time may be less accurate. In order to avoid inaccurate determinations and to avoid expending computing resources on an optimization process likely to yield inaccurate results, the performance optimization system in an embodiment may only complete the optimization process when it is determined that the workload of interest has met certain utilization thresholds.

The performance optimization system in an embodiment may collect measurements of a plurality of features affecting performance of an information handling system. For example, in an embodiment described with reference to FIG. 3, such features 302 may include the number of Hard Disk Drive (HDD) writes, a turbo-residency, Graphics Processing Unit (GPU) utilization, core (CPU) utilization, and/or CPU Level 2 (L2) cache hits. These are only a handful of possible features 302 that may be measured as instrumentation data in an embodiment. Potentially hundreds of features may be measured in an embodiment, dependent upon the likelihood that such a feature may impact performance of a given workload in an embodiment. Each of these feature measurements (e.g. instrumentation data) may constitute a measure of utilization of the workload of interest in an embodiment. In some embodiments, only a subset of the measured features may be considered in determining utilization of the workload of interest. For example, if the workload of interest is particularly graphics-intensive, the performance optimization system may gauge the utilization of the workload of interest solely by the measure of GPU utilization, or by the measure of GPU utilization and one or more other features.

The performance optimization system in an embodiment may determine at block 708 whether the utilization of the workload of interest meets a threshold utilization value. Threshold utilization measurements in an embodiment may include a percentage utilization of any of the measured features 306-312, or any other measured features. For example, in an embodiment in which the workload of interest is particularly graphics-intensive, the utilization threshold may be an 80% utilization rate of the GPU. In an embodiment in which the utilization threshold is not met, the method may proceed to block 710. In an embodiment in which the utilization threshold is met, the method may proceed to block 712 for execution of the optimization process.

At block 710, in an embodiment in which the utilization of the workload of interest does not meet a threshold utilization value, the performance optimization system may enter a sleep state. As described herein, the performance optimization system in an embodiment may delay performance of an optimization system when the utilization threshold is not met, in order to avoid generating inaccurate results, and to avoid unnecessary expenditure of computing resources on an optimization process likely to yield inaccurate results. The performance optimization system in such an embodiment may enter a sleep state until a preset duration has elapsed, and the method may proceed back to block 706 for measurement of the utilization of the workload of interest at a later time.

The learning window optimization system in an embodiment in which the utilization of the workload of interest meets a threshold utilization value may collect instrumentation field data during field execution of the workload of interest based on the default or optimized learning window parameter configuration associated with the workload of interest at block 712. As described herein, instrumentation data on features may be measured and recorded across a number of windows, separated by a polling interval, over a preset monitoring length. For example, over the length of monitoring 304, or during portions of the length of monitoring 304, the performance optimization system in an embodiment may record or monitor HDD writes 306, turbo residency 308, GPU utilization 310, core utilization 312, and/or L2 cache hits 314.

The number of windows, polling interval, and monitoring length used to collect instrumentation data at block 712 may be dictated by the default or most recently field-optimized learning window parameter configuration. For example, a first subset of instrumentation data measuring HDD writes 306, turbo residency 308, GPU utilization 310, core utilization 312, and/or cache hits 314 may be recorded within a first window 316, and a second subset of instrumentation data measuring the same features 302 may be recorded within a second window 318. In such an embodiment, the machine learning model may attempt to identify an optimal system setting using only the instrumentation data within these two windows 316 and 318. The duration of each window (e.g., 316 and 318) in an embodiment may be determined based on the overall length of monitoring 304, number of windows, and polling interval 320 defined in the default or most recently field-optimized learning window parameter configuration.

At block 714, the performance optimization system in an embodiment may determine optimal field system settings for the workload of interest using the machine learning model. The performance optimization system in an embodiment may perform a workload classification process in order to associate the instrumentation field data describing the workload of interest collected at block 712 with a known optimal system setting. As described herein, the workload classification process in some embodiments may include aggregating the workload characterized by the instrumentation field data into cluster centroids representing a number of distinct candidate optimal system settings. Such clustering in an embodiment may be performed using a majority voting method, or a two-thirds majority voting method, depending upon the voting method identified in the default or most recently field-optimized learning window parameter configuration.

The instrumentation field data recorded at block 712 may then be associated with a candidate optimal setting in an embodiment using a workload analysis operation. During such a workload analysis operation, the instrumentation field data (or cluster centroid that characterizes it) may be compared against other previously recorded test instrumentation data the machine learning model has already associated with a known optimal system setting. The instrumentation test data that is most similar to the instrumentation field data, or the instrumentation test data centroid that is closest to the instrumentation field data centroid may then be identified. The optimal system setting associated in the machine learning model with the most similar instrumentation test data or its centroid may then be identified as the optimal system setting for the workload of interest for the current window. This determination may be made for each of several windows, separately before any optimal system settings are applied to the information handling system in an embodiment.

The performance optimization system in an embodiment may determine at block 716 whether the optimal field system settings meet an accuracy threshold value. The accuracy of the classification process used at step 714 to determine the optimal system setting may be tested by comparison to known optimal settings and known non-optimal settings for the same workload. Such a plurality of comparisons may include comparison to a true positive and a plurality of false positives (where the non-optimal settings were identified incorrectly as optimal). A receiver operating characteristic curve may then be generated by comparing the rate of true positives to the rate of false positives across a plurality of executions. One measure of the accuracy of the classification process in an embodiment may include determining the area under the receiver operating characteristic curve, or area under the curve (AUC). In other embodiments, a confusion matrix may be used to determine accuracy of the classification process. Example accuracy thresholds in an embodiment may include an AUC threshold value at or above 0.9, or fewer than 20% false positives.

At block 718, in an embodiment in which the determined optimal field system settings do not meet the accuracy threshold value, the instrumentation field data collected at block 712 and the optimal field system setting determined at block 714 may be discarded. The instrumentation field data discarded in such an embodiment may apply only to data recorded across a single learning window. This may occur in some embodiments in which one or more components for which instrumentation data is being gathered at block 712 experiences atypical utilization for reasons not related to the workload of interest. Such atypical utilization may result in essentially corrupted instrumentation field data. Thus, if the determined optimal system setting accuracy does not meet the threshold, the recorded instrumentation field data for that window, and the optimal system setting determination made based on the instrumentation field data for that window may be discarded such that they are not considered when determining an optimal system setting to apply to the information handling system to optimize performance during execution of the workload of interest.

The performance optimization system may store instrumentation field data and optimal field system settings in a memory at block 720 in an embodiment in which the optimal field system settings meet the accuracy threshold value. If the accuracy of the optimal system setting meets or exceeds the accuracy threshold, it may be considered for later application to the optimize the performance of the information handling system during execution of the workload of interest. Such a final determination and application may be determined by choosing the most accurate determination made across a plurality of windows in an embodiment. Thus, the determination based on the current window may be stored at block 720 for comparison for similar determinations made based on future windows.

At block 722, the performance optimization system in an embodiment may determine whether the polling interval has elapsed since the collection of field instrumentation data. The polling interval dictated by the default learning window parameter configuration or by the most recent field-optimized learning window parameter configuration may dictate a period of time that may elapse between learning windows in which instrumentation field data is collected. If the polling interval has not yet elapsed, the performance optimization system in an embodiment may enter a sleep state at block 724 until that polling interval has elapsed. When the polling interval has elapsed, the method may proceed to block 726 to determine whether data should be collected in a new learning window.

At block 726, the performance optimization system may determine whether data has been collected for all windows defined by the default or optimal learning window parameter configuration in an embodiment in which the polling interval has elapsed since the collection of field instrumentation. The default or most recent field-optimized learning window parameter configuration may dictate the number of windows for which optimal system settings may be determined and stored prior to determination of a final optimal system setting. For example, the default or most recent field-optimized learning window parameter configuration may dictate that instrumentation field data be collected across seven windows. In such an embodiment, if data has only been collected at block 712 for six windows, the method may proceed back to 706 to determine if it is appropriate (based on current utilization of the workload of interest) to begin collecting instrumentation field data in a new, seventh window. If data has been collected at block 712 for seven windows in such an embodiment, the method may proceed to block 728.

As another example embodiment, the default or most recent field-optimized learning window parameter configuration may dictate not only that instrumentation field data be collected across seven windows, but that optimal system settings meeting the accuracy threshold also be determined and stored for seven windows. In such an embodiment, instrumentation field data may be collected across more than seven windows during execution of the method illustrated in FIG. 7, if any of the optimal system settings determined for a given window do not meet the accuracy threshold. If optimal system settings meeting the accuracy threshold have not been determined for seven windows in such an embodiment, the method may proceed back to 706 to determine if it is appropriate (based on current utilization of the workload of interest) to begin collecting instrumentation field data in a new window. If optimal system settings meeting the accuracy threshold have been determined for seven windows in such an embodiment, the method may proceed to block 728.

The performance optimization system in an embodiment in which data has been collected for each of the windows defined by the default or optimal learning window parameter configuration may identify the most accurate stored optimal system setting across all windows. The performance optimization system in such an embodiment may then apply that setting to the information handling system to optimize performance of the information handling system during execution of the workload of interest. For example, the performance optimization system in an embodiment may compare the AUCs associated with determinations of optimal system settings made across each of seven windows in order to identify an optimal system setting associated with a highest AUC. Other accuracy measurements (e.g. confusion matrices) may be used in other embodiments. The performance optimization system in such an embodiment may then apply the optimal system settings associated with the highest accuracy measurement across all windows to the information handling system to optimize its performance during execution of the workload of interest. The method may then end.

The blocks of the flow diagrams 6-7 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a performance optimization system comprising:
    a data bus coupled to a processor and a non-transitory, computer-readable storage medium; and
    the processor executing computer program code instructions that interact with a plurality of computer operations and that is configured for:
    inputting an application workload into a predetermined statistical model to output a predicted optimized hardware configuration for the information handling system;
    iteratively sampling hardware component field performance data describing performance of a hardware component of the information handling system during one or more learning windows, the learning windows having a preset duration and occurring at a preset frequency according to optimal learning window parameters to decrease computing resources consumed during determination of the predicted optimized hardware configuration by the predetermined statistical model, wherein the optimal learning window parameters are determined based on accuracy of previous application of the predetermined statistical model to previous hardware component test performance data as previously sampled during testing;
    adjusting performance of the hardware component of the information handling system by configuring the hardware component according to the predicted optimized hardware configuration based on application of the predetermined statistical model to the iteratively sampled field performance data.

2. The information handling system of claim 1, wherein the processor executing computer program code instructions is further configured for:
    characterizing workloads in operation at runtime to analyze performance of the hardware component of the information handling system during usage; and
    identifying a hardware component configuration to be changed to obtain optimal performance of the hardware component based upon the characterizing of workloads.

3. The information handling system of claim 2, wherein the adjustment of the performance of the hardware component is performed dynamically for varying workloads to account for varying workloads, the varying workloads comprising random stochastic variation in workload, or abrupt user or operating system level discontinuities in jobs.

4. The information handling system of claim 1, wherein the optimal learning window parameters includes an optimal voting method and the optimized system configurations are determined based upon the optimal voting method.

5. The information handling system of claim 1, wherein the accuracy of previous application of the predetermined statistical model is defined by an area under a receiver operating characteristic curve for the previous application of the predetermined statistical model.

6. The information handling system of claim 1, wherein the iteratively sampled hardware component field performance data excludes performance data falling below a utilization threshold.

7. The information handling system of claim 1, wherein the predetermined statistical model comprises a supervised learning operation, the supervised learning operation statistically mapping a measurement of performance of the hardware component of the information handling system to an optimal hardware component configuration.

8. A method for optimizing performance of an information handling system comprising:
    sampling, via a processor, hardware component testing performance measurements of a hardware component of the information handling system over a preset test monitoring duration and partitioning the hardware component testing performance measurements within the preset test monitoring duration into one or more learning windows having a frequency and a window duration preset according to each of a plurality of candidate learning window parameter configurations;
    applying a statistical model to the sampled hardware component testing performance measurements for each of the plurality of candidate learning window parameter configurations to yield modeled system settings;
    determining an accuracy associated with each candidate learning window parameter configuration by determining accuracy of each modeled system setting compared with a known optimal system setting; and
    identifying a most accurate window learning parameter configuration as the optimal window learning parameter configuration for use in sampling hardware component field performance measurements describing performance of a hardware component of the information handling system during field usage to determine field optimized system settings according to the statistical model using limited computing resources.

9. The method of claim 8 further comprising:
    characterizing workloads in operation at runtime to analyze test performance of the hardware component of the information handling system during usage; and
    identifying a hardware component configuration to be changed to obtain optimal hardware component field performance based upon the characterizing of workloads.

10. The method of claim 9, wherein the characterizing workloads is performed dynamically for varying workloads to account for varying workloads, the varying workloads comprising random stochastic variation in workload, or abrupt user or operating system level discontinuities in jobs.

11. The method of claim 8 further comprising:
excluding from consideration as the optimal tuning parameter configuration a candidate tuning parameter configuration having a candidate accuracy falling below an accuracy threshold.

12. The method of claim 11, wherein the accuracy threshold is a false positive rate of 20%.

13. The method of claim 8, wherein the optimal learning window parameters include an optimal voting method for determination of the field optimized hardware component configurations.

14. The method of claim 8, wherein the candidate accuracy for each of the plurality of candidate tuning parameter configurations is defined by an area under a receiver operating characteristic curve for the candidate laboratory optimal system setting determination.

15. An information handling system operating a performance optimization system comprising:
a data bus coupled to a processor and a non-transitory, computer-readable storage medium; and
the processor executing computer program code instructions that interact with a plurality of computer operations and that is configured for:
inputting an application workload into a predetermined statistical model to output a predicted optimized hardware configuration for the information handling system;
iteratively sampling hardware component field performance data describing performance of a hardware component of the information handling system during one or more learning windows, the learning windows having a preset duration and occurring at a preset frequency according to optimal learning window parameters to decrease computing resources consumed during determination of the predicted optimized hardware configuration by the predetermined statistical model, wherein the optimal learning window parameters are determined based on accuracy of previous application of the predetermined statistical model to previous hardware component test performance data as previously sampled during testing;
characterizing workloads in operation at runtime based on application of the predetermined statistical model to the iteratively sampled field performance data;
identifying a hardware component configuration to be changed to obtain optimal performance of the hardware component based upon the characterizing of workloads;
applying the hardware component configuration to be changed to obtain optimal performance of the hardware component.

16. The information handling system of claim 15, wherein the characterizing of workloads is performed dynamically for varying workloads to account for varying workloads, the varying workloads comprising random stochastic variation in workload, or abrupt user or operating system level discontinuities in jobs.

17. The method of claim 15, wherein the instructions executable by the processor are further configured for:
classifying workloads into predefined performance clusters.

18. The method of claim 17, wherein the workloads being classified comprise known workloads and unknown workloads.

19. The information handling system of claim 15, wherein the accuracy of previous application of the statistical model is defined by an area under a receiver operating characteristic curve for the previous application of the statistical model.

20. The information handling system of claim 15, wherein the optimal learning window parameters include an optimal voting method and the optimal system setting is determined based upon the optimal voting method.

* * * * *